US012627414B2

(12) United States Patent　　　　　　(10) Patent No.:　US 12,627,414 B2
Khoshnevisan et al.　　　　　　　　　　(45) Date of Patent:　May 12, 2026

(54) MULTIPLEXING TWO-PART HYBRID AUTOMATIC REPEAT REQUEST (HARQ) FEEDBACK ON AN UPLINK SHARED CHANNEL

(71) Applicant: QUALCOMM Incorporated, San Diego, CA (US)

(72) Inventors: Mostafa Khoshnevisan, San Diego, CA (US); Jing Sun, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 302 days.

(21) Appl. No.: 18/527,670

(22) Filed: Dec. 4, 2023

(65) Prior Publication Data

US 2025/0184044 A1　　Jun. 5, 2025

(51) Int. Cl.
　　H04L 1/1822　　　(2023.01)
　　H04L 1/00　　　　(2006.01)
(52) U.S. Cl.
　　CPC .......... H04L 1/1822 (2013.01); H04L 1/0013 (2013.01)
(58) Field of Classification Search
　　None
　　See application file for complete search history.

(56) References Cited

U.S. PATENT DOCUMENTS

2020/0137695 A1　　4/2020　Papasakellariou
2025/0096942 A1*　3/2025　Khoshnevisan ...... H04L 1/1621

2025/0096945 A1*　3/2025　Khoshnevisan ...... H04L 1/1861
2025/0096949 A1*　3/2025　Khoshnevisan ...... H04L 1/1896
2025/0096952 A1*　3/2025　Khoshnevisan ...... H04W 72/21
2025/0096983 A1*　3/2025　Khoshnevisan ...... H04L 1/1861
2025/0150214 A1*　5/2025　Huang .................. H04L 1/1861

FOREIGN PATENT DOCUMENTS

WO　　WO-2023077434 A1　　5/2023
WO　　WO-2023079916 A1　　5/2023
WO　　WO-2023201505 A1　　10/2023

OTHER PUBLICATIONS

International Search Report and Written Opinion—PCT/US2024/051256—ISA/EPO—Feb. 11, 2025 (2308426WO).

* cited by examiner

*Primary Examiner* — Anh Vu H Ly
(74) *Attorney, Agent, or Firm* — Holland & Hart LLP

(57) ABSTRACT

Methods, systems, and devices for wireless communications are described. A user equipment (UE) may be scheduled to report feedback for downlink messages, the feedback scheduled to overlap with transmission of a physical uplink shared channel (PUSCH) message. The feedback may include a first hybrid automatic repeat request (HARQ) feedback portion corresponding to a first, fixed quantity of bits and a second HARQ feedback portion corresponding to a second, variable quantity of bits. The UE may determine respective quantities of resource elements (REs) corresponding to the first and second quantities of bits. For example, the second quantity of REs may correspond to a maximum quantity of bits. The UE may transmit the first and second HARQ feedback portions with the PUSCH message via the respective REs. The UE may transmit the second HARQ feedback portion according to a rate-matching procedure, a puncturing procedure, or both, or based on a timeline.

30 Claims, 20 Drawing Sheets

105-d 115-d

PDSCHs

705

710 — Determine first quantity of REs

715 — Determine second quantity of REs

720 — Perform rate-matching procedure

725 — First HARQ feedback portion of the HARQ feedback message

730 — Second HARQ feedback portion of the HARQ feedback message

Decode HARQ feedback message

735

700

810

820

815

805

800

Receiver

1210

Communications Manager

1220

Transmitter

1215

1205

1200

130

105

115

Network
Entity

Transceiver

1510

Antenna

1515

Communications
Manager

1520

Memory

Code

1530

1525

1540

Processor

1535

1505

1500

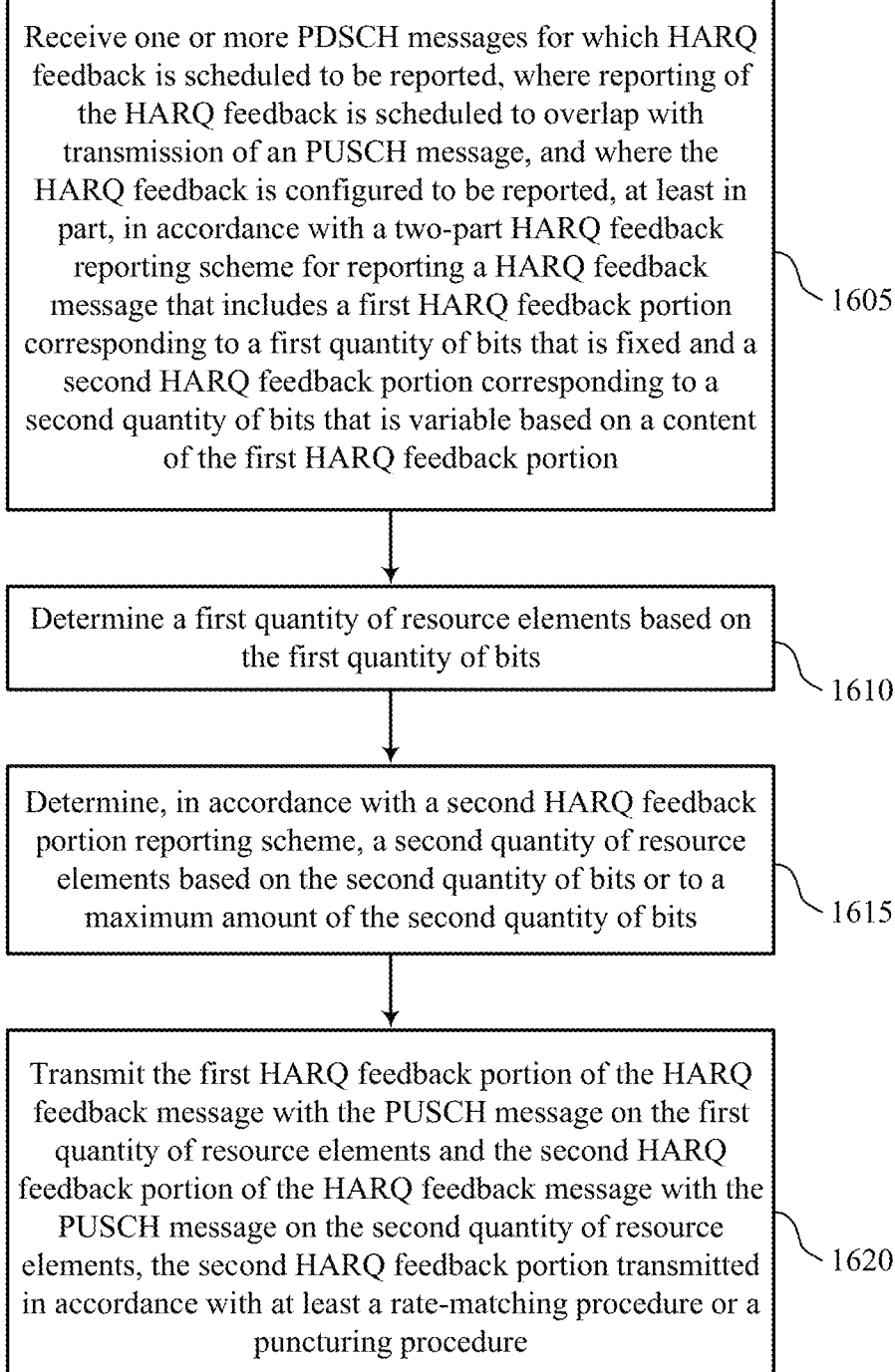

Receive one or more PDSCH messages for which HARQ feedback is scheduled to be reported, where reporting of the HARQ feedback is scheduled to overlap with transmission of an PUSCH message, and where the HARQ feedback is configured to be reported, at least in part, in accordance with a two-part HARQ feedback reporting scheme for reporting a HARQ feedback message that includes a first HARQ feedback portion corresponding to a first quantity of bits that is fixed and a second HARQ feedback portion corresponding to a second quantity of bits that is variable based on a content of the first HARQ feedback portion

1605

Determine a first quantity of resource elements based on the first quantity of bits

1610

Determine, in accordance with a second HARQ feedback portion reporting scheme, a second quantity of resource elements based on the second quantity of bits or to a maximum amount of the second quantity of bits

1615

Transmit the first HARQ feedback portion of the HARQ feedback message with the PUSCH message on the first quantity of resource elements and the second HARQ feedback portion of the HARQ feedback message with the PUSCH message on the second quantity of resource elements, the second HARQ feedback portion transmitted in accordance with at least a rate-matching procedure or a puncturing procedure

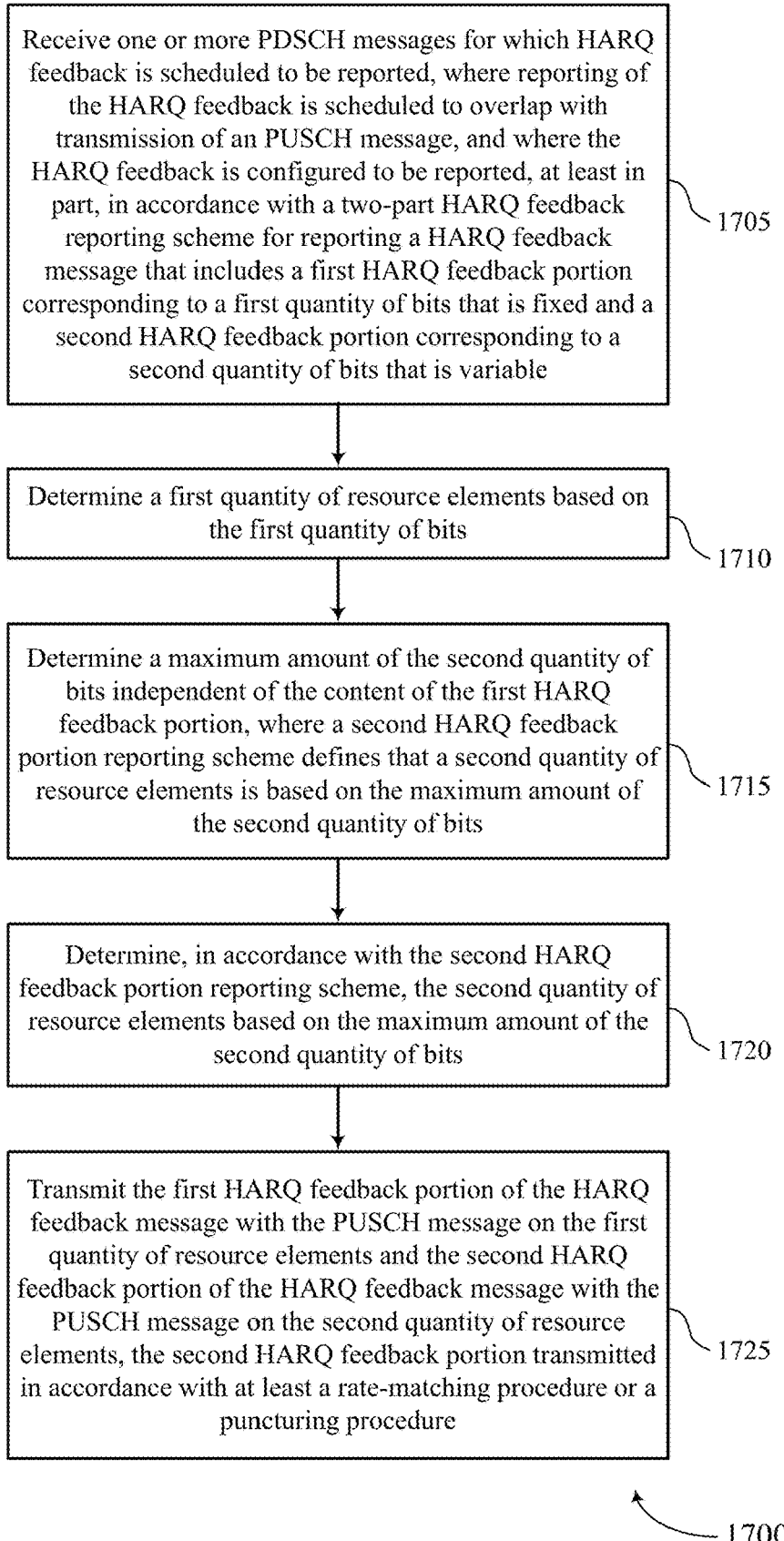

Receive one or more PDSCH messages for which HARQ feedback is scheduled to be reported, where reporting of the HARQ feedback is scheduled to overlap with transmission of an PUSCH message, and where the HARQ feedback is configured to be reported, at least in part, in accordance with a two-part HARQ feedback reporting scheme for reporting a HARQ feedback message that includes a first HARQ feedback portion corresponding to a first quantity of bits that is fixed and a second HARQ feedback portion corresponding to a second quantity of bits that is variable ⌐ 1705

Determine a first quantity of resource elements based on the first quantity of bits ⌐ 1710

Determine a maximum amount of the second quantity of bits independent of the content of the first HARQ feedback portion, where a second HARQ feedback portion reporting scheme defines that a second quantity of resource elements is based on the maximum amount of the second quantity of bits ⌐ 1715

Determine, in accordance with the second HARQ feedback portion reporting scheme, the second quantity of resource elements based on the maximum amount of the second quantity of bits ⌐ 1720

Transmit the first HARQ feedback portion of the HARQ feedback message with the PUSCH message on the first quantity of resource elements and the second HARQ feedback portion of the HARQ feedback message with the PUSCH message on the second quantity of resource elements, the second HARQ feedback portion transmitted in accordance with at least a rate-matching procedure or a puncturing procedure ⌐ 1725

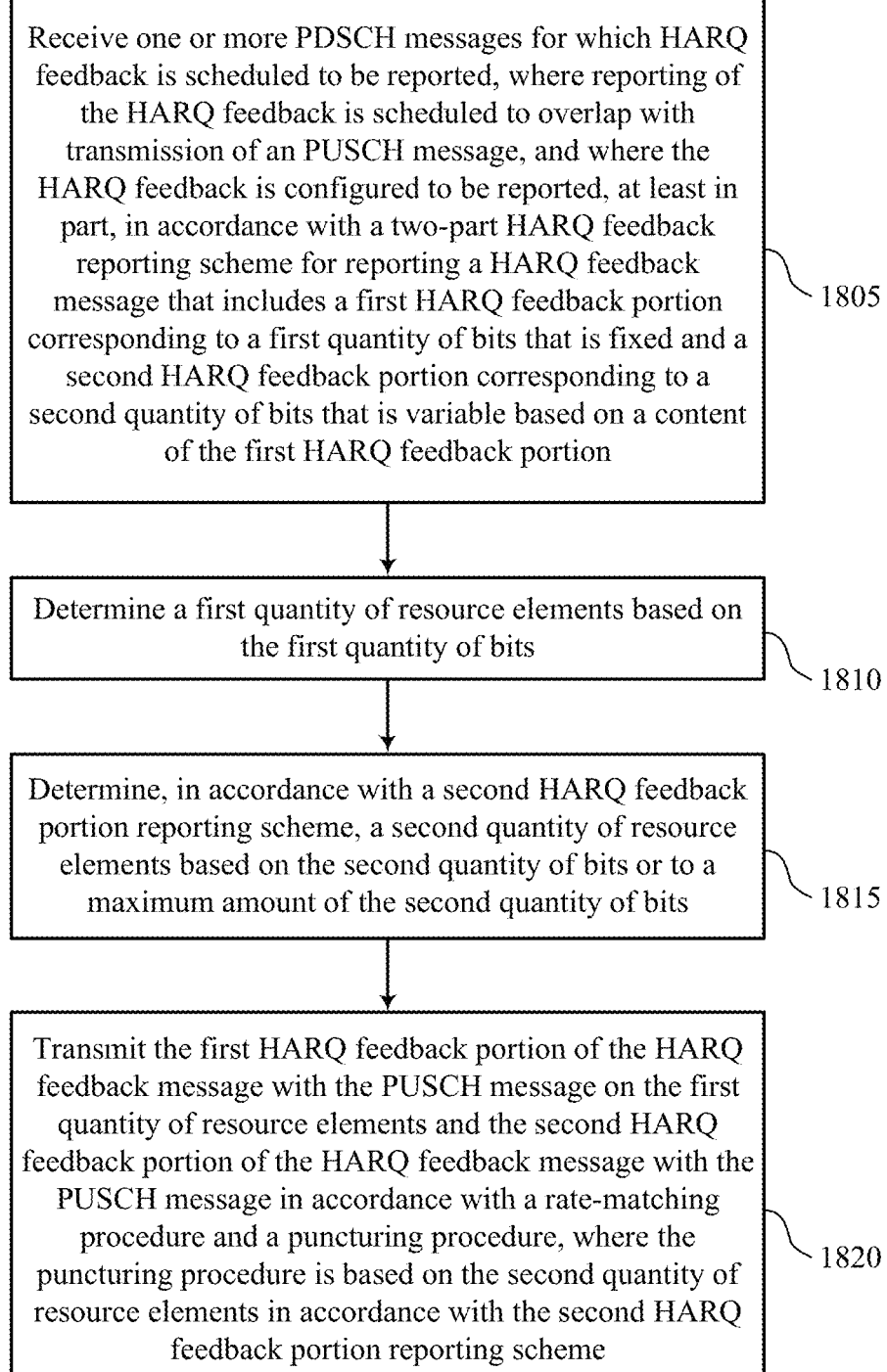

Receive one or more PDSCH messages for which HARQ feedback is scheduled to be reported, where reporting of the HARQ feedback is scheduled to overlap with transmission of an PUSCH message, and where the HARQ feedback is configured to be reported, at least in part, in accordance with a two-part HARQ feedback reporting scheme for reporting a HARQ feedback message that includes a first HARQ feedback portion corresponding to a first quantity of bits that is fixed and a second HARQ feedback portion corresponding to a second quantity of bits that is variable based on a content of the first HARQ feedback portion

1805

Determine a first quantity of resource elements based on the first quantity of bits

1810

Determine, in accordance with a second HARQ feedback portion reporting scheme, a second quantity of resource elements based on the second quantity of bits or to a maximum amount of the second quantity of bits

1815

Transmit the first HARQ feedback portion of the HARQ feedback message with the PUSCH message on the first quantity of resource elements and the second HARQ feedback portion of the HARQ feedback message with the PUSCH message in accordance with a rate-matching procedure and a puncturing procedure, where the puncturing procedure is based on the second quantity of resource elements in accordance with the second HARQ feedback portion reporting scheme

Figure 19:
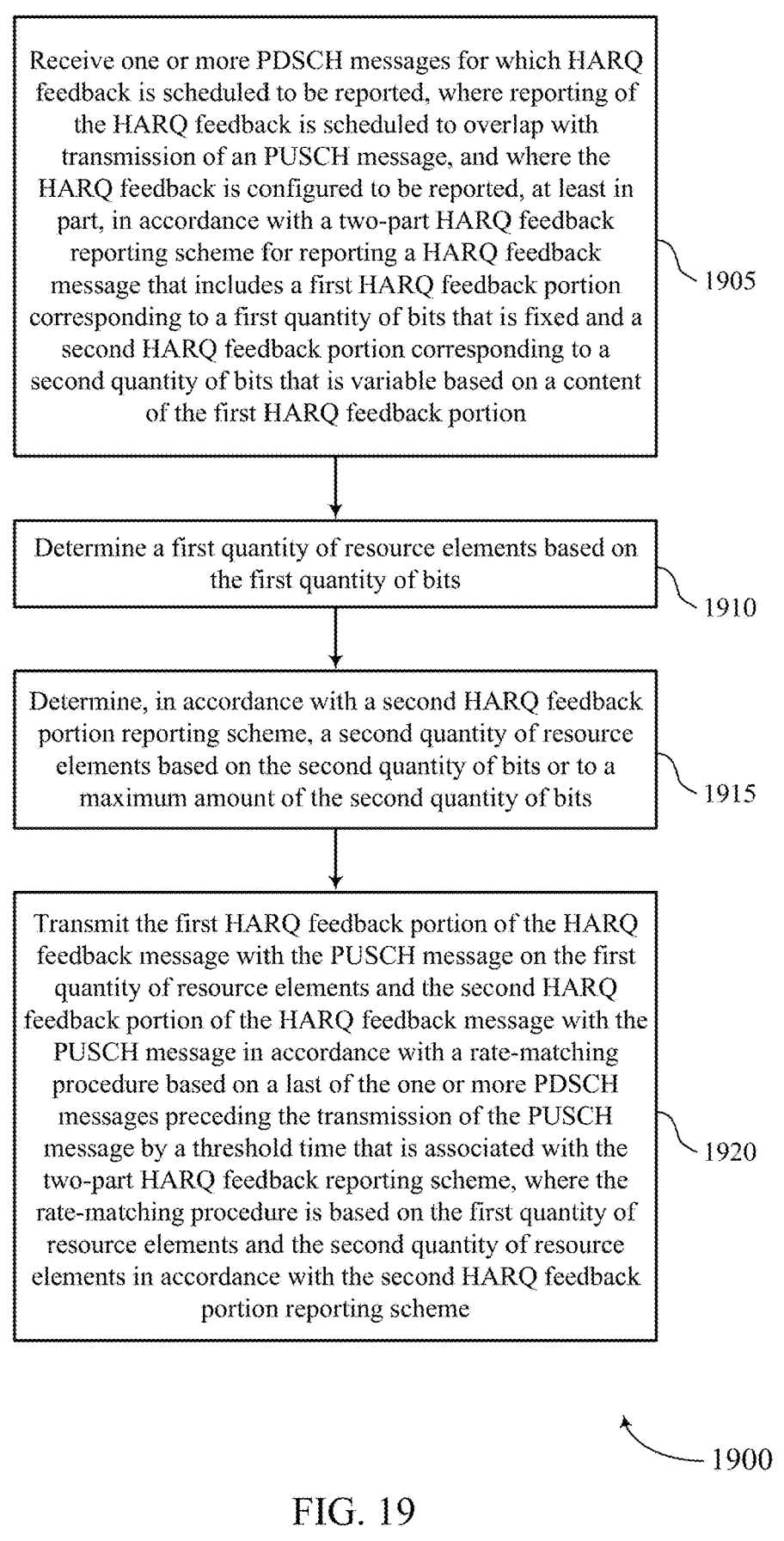

Receive one or more PDSCH messages for which HARQ feedback is scheduled to be reported, where reporting of the HARQ feedback is scheduled to overlap with transmission of an PUSCH message, and where the HARQ feedback is configured to be reported, at least in part, in accordance with a two-part HARQ feedback reporting scheme for reporting a HARQ feedback message that includes a first HARQ feedback portion corresponding to a first quantity of bits that is fixed and a second HARQ feedback portion corresponding to a second quantity of bits that is variable based on a content of the first HARQ feedback portion

1905

Determine a first quantity of resource elements based on the first quantity of bits

1910

Determine, in accordance with a second HARQ feedback portion reporting scheme, a second quantity of resource elements based on the second quantity of bits or to a maximum amount of the second quantity of bits

1915

Transmit the first HARQ feedback portion of the HARQ feedback message with the PUSCH message on the first quantity of resource elements and the second HARQ feedback portion of the HARQ feedback message with the PUSCH message in accordance with a rate-matching procedure based on a last of the one or more PDSCH messages preceding the transmission of the PUSCH message by a threshold time that is associated with the two-part HARQ feedback reporting scheme, where the rate-matching procedure is based on the first quantity of resource elements and the second quantity of resource elements in accordance with the second HARQ feedback portion reporting scheme

Figure 20:
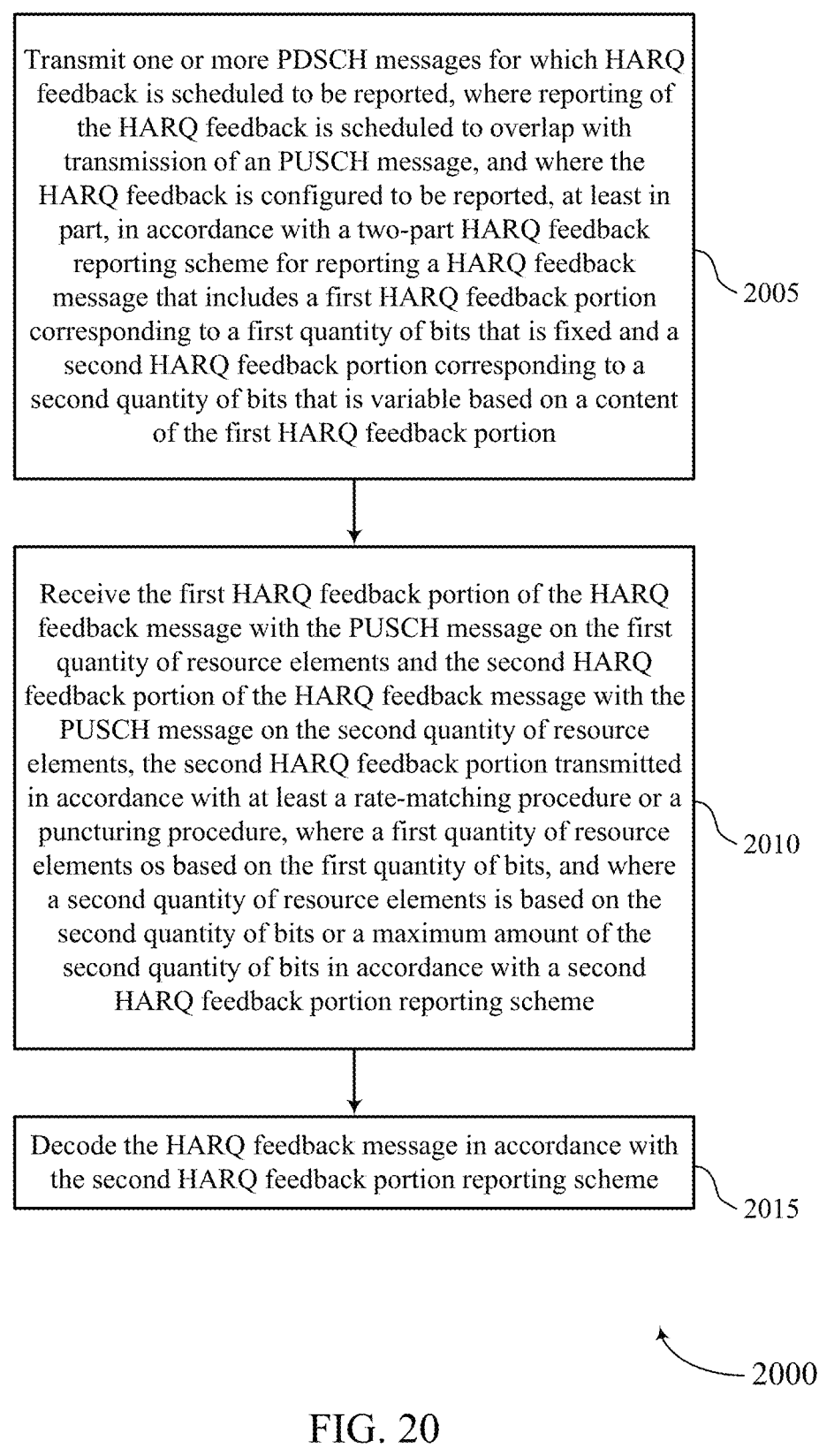

Transmit one or more PDSCH messages for which HARQ feedback is scheduled to be reported, where reporting of the HARQ feedback is scheduled to overlap with transmission of an PUSCH message, and where the HARQ feedback is configured to be reported, at least in part, in accordance with a two-part HARQ feedback reporting scheme for reporting a HARQ feedback message that includes a first HARQ feedback portion corresponding to a first quantity of bits that is fixed and a second HARQ feedback portion corresponding to a second quantity of bits that is variable based on a content of the first HARQ feedback portion

2005

Receive the first HARQ feedback portion of the HARQ feedback message with the PUSCH message on the first quantity of resource elements and the second HARQ feedback portion of the HARQ feedback message with the PUSCH message on the second quantity of resource elements, the second HARQ feedback portion transmitted in accordance with at least a rate-matching procedure or a puncturing procedure, where a first quantity of resource elements os based on the first quantity of bits, and where a second quantity of resource elements is based on the second quantity of bits or a maximum amount of the second quantity of bits in accordance with a second HARQ feedback portion reporting scheme

2010

Decode the HARQ feedback message in accordance with the second HARQ feedback portion reporting scheme

MULTIPLEXING TWO-PART HYBRID AUTOMATIC REPEAT REQUEST (HARQ) FEEDBACK ON AN UPLINK SHARED CHANNEL

FIELD OF TECHNOLOGY

The following relates to wireless communications, including multiplexing two-part hybrid automatic repeat request (HARQ) feedback on an uplink shared channel.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support multiplexing two-part hybrid automatic repeat request (HARQ) feedback on an uplink shared channel, such as a physical uplink shared channel (PUSCH). A user equipment (UE) may be scheduled to report HARQ feedback for one or more downlink messages, where the HARQ feedback is scheduled to overlap with a PUSCH transmission. The UE may be configured to report the HARQ feedback according to a two-part HARQ feedback reporting scheme, in which the HARQ feedback may include a first portion (e.g., first part) corresponding to a first quantity of bits that is fixed and a second portion (e.g., second part) corresponding to a second quantity of bits that is variable. In addition, the UE may determine a first quantity of resource elements (REs) based on the first quantity of bits and a second quantity of REs based on the second quantity of bits or a maximum number of the second quantity of bits. That is, the first and second quantities of REs may correspond to the respective portions of the two-part HARQ feedback. The UE may transmit the first portion of the HARQ feedback with the PUSCH message on the first quantity of REs and the second portion of the HARQ feedback with the PUSCH message on the second quantity of REs. In some examples, the UE may transmit the second portion in according to a rate-matching procedure, a puncturing procedure, or both. For example, the UE may transmit the second portion according to a rate-matching procedure that is based on the first quantity of REs and a puncturing procedure that is based on the second quantity of REs. Alternatively, the UE may transmit the second portion according to a rate-matching procedure that is based on the last-received physical downlink shared channel (PDSCH) message preceding the PUSCH message transmission by some threshold time, where the rate-matching procedure is then based on the first and second quantities of REs.

A method for wireless communications by a UE is described. The method may include receiving one or more PDSCH messages for which HARQ feedback is scheduled to be reported, where reporting of the HARQ feedback is scheduled to overlap with transmission of a PUSCH message, and where the HARQ feedback is configured to be reported, at least in part, in accordance with a two-part HARQ feedback reporting scheme for reporting a HARQ feedback message that includes a first HARQ feedback portion corresponding to a first quantity of bits that is fixed and a second HARQ feedback portion corresponding to a second quantity of bits that is variable based on a content of the first HARQ feedback portion, determining a first quantity of REs based on the first quantity of bits, determining, in accordance with a second HARQ feedback portion reporting scheme, a second quantity of REs based on the second quantity of bits or to a maximum amount of the second quantity of bits, and transmitting the first HARQ feedback portion of the HARQ feedback message with the PUSCH message on the first quantity of REs and the second HARQ feedback portion of the HARQ feedback message with the PUSCH message on the second quantity of REs, the second HARQ feedback portion transmitted in accordance with at least a rate-matching procedure or a puncturing procedure.

A UE for wireless communications is described. The UE may include one or more memories storing processor executable code, and one or more processors coupled with the one or more memories. The one or more processors may individually or collectively operable to execute the code to cause the UE to receive one or more PDSCH messages for which HARQ feedback is scheduled to be reported, where reporting of the HARQ feedback is scheduled to overlap with transmission of an PUSCH message, and where the HARQ feedback is configured to be reported, at least in part, in accordance with a two-part HARQ feedback reporting scheme for reporting a HARQ feedback message that includes a first HARQ feedback portion corresponding to a first quantity of bits that is fixed and a second HARQ feedback portion corresponding to a second quantity of bits that is variable based on a content of the first HARQ feedback portion, determine a first quantity of REs based on the first quantity of bits, determine, in accordance with a second HARQ feedback portion reporting scheme, a second quantity of REs based on the second quantity of bits or to a maximum amount of the second quantity of bits, and transmit the first HARQ feedback portion of the HARQ feedback message with the PUSCH message on the first quantity of REs and the second HARQ feedback portion of the HARQ feedback message with the PUSCH message on the second quantity of REs, the second HARQ feedback portion transmitted in accordance with at least a rate-matching procedure or a puncturing procedure.

Another UE for wireless communications is described. The UE may include means for receiving one or more PDSCH messages for which HARQ feedback is scheduled to be reported, where reporting of the HARQ feedback is scheduled to overlap with transmission of an PUSCH message, and where the HARQ feedback is configured to be reported, at least in part, in accordance with a two-part HARQ feedback reporting scheme for reporting a HARQ feedback message that includes a first HARQ feedback portion corresponding to a first quantity of bits that is fixed and a second HARQ feedback portion corresponding to a second quantity of bits that is variable based on a content of the first HARQ feedback portion, means for determining a first quantity of REs based on the first quantity of bits, means for determining, in accordance with a second HARQ feedback portion reporting scheme, a second quantity of REs based on the second quantity of bits or to a maximum amount of the second quantity of bits, and means for transmitting the first HARQ feedback portion of the HARQ feedback message with the PUSCH message on the first quantity of REs and the second HARQ feedback portion of the HARQ feedback message with the PUSCH message on the second quantity of REs, the second HARQ feedback portion transmitted in accordance with at least a rate-matching procedure or a puncturing procedure.

A non-transitory computer-readable medium storing code for wireless communications is described. The code may include instructions executable by one or more processors to receive one or more PDSCH messages for which HARQ feedback is scheduled to be reported, where reporting of the HARQ feedback is scheduled to overlap with transmission of an PUSCH message, and where the HARQ feedback is configured to be reported, at least in part, in accordance with a two-part HARQ feedback reporting scheme for reporting a HARQ feedback message that includes a first HARQ feedback portion corresponding to a first quantity of bits that is fixed and a second HARQ feedback portion corresponding to a second quantity of bits that is variable based on a content of the first HARQ feedback portion, determine a first quantity of REs based on the first quantity of bits, determine, in accordance with a second HARQ feedback portion reporting scheme, a second quantity of REs based on the second quantity of bits or to a maximum amount of the second quantity of bits, and transmit the first HARQ feedback portion of the HARQ feedback message with the PUSCH message on the first quantity of REs and the second HARQ feedback portion of the HARQ feedback message with the PUSCH message on the second quantity of REs, the second HARQ feedback portion transmitted in accordance with at least a rate-matching procedure or a puncturing procedure.

In some examples of the method, UEs, and non-transitory computer-readable medium described herein, determining the second quantity of REs may include operations, features, means, or instructions for determining the maximum amount of the second quantity of bits independent of the content of the first HARQ feedback portion, where the second HARQ feedback portion reporting scheme defines that the second quantity of REs may be based on the maximum amount of the second quantity of bits.

In some examples of the method, UEs, and non-transitory computer-readable medium described herein, the second quantity of REs may be based on a quantity of CRC bits corresponding to the maximum amount of the second quantity of bits.

In some examples of the method, UEs, and non-transitory computer-readable medium described herein, application of the second HARQ feedback portion reporting scheme may be based on the PUSCH message including an uplink transport block.

In some examples of the method, UEs, and non-transitory computer-readable medium described herein, application of the second HARQ feedback portion reporting scheme may be based on a last of the one or more PDSCH messages being received less than a threshold duration of time prior to transmission of the PUSCH message.

In some examples of the method, UEs, and non-transitory computer-readable medium described herein, the second quantity of REs may be populated with a sequence of values that may be based on the second quantity of bits being zero.

In some examples of the method, UEs, and non-transitory computer-readable medium described herein, transmitting the first HARQ feedback portion and the second HARQ feedback portion of the HARQ feedback message with the PUSCH message may include operations, features, means, or instructions for refraining to include the second quantity of REs in the HARQ feedback message based on the second quantity of bits being zero.

In some examples of the method, UEs, and non-transitory computer-readable medium described herein, transmitting the first HARQ feedback portion and the second HARQ feedback portion of the HARQ feedback message with the PUSCH message may include operations, features, means, or instructions for transmitting the second HARQ feedback portion of the HARQ feedback message with the PUSCH message in accordance with the rate-matching procedure and the puncturing procedure, where the puncturing procedure may be based on the second quantity of REs in accordance with the second HARQ feedback portion reporting scheme.

In some examples of the method, UEs, and non-transitory computer-readable medium described herein, the rate-matching procedure may be based on the first quantity of REs.

Some examples of the method, UEs, and non-transitory computer-readable medium described herein may further include operations, features, means, or instructions for determining that channel state information (CSI) may be available for transmission with the PUSCH message, determining a maximum amount of the second quantity of REs based on the maximum amount of the second quantity of bits, where the maximum amount of the second quantity of bits may be independent of the content of the first HARQ feedback portion, reserving the maximum amount of the second quantity of REs for the puncturing procedure, and allocating, for transmission with the PUSCH message, a third quantity of REs corresponding to the CSI, where the third quantity of REs may be exclusive of the reserved maximum amount of the second quantity of REs.

In some examples of the method, UEs, and non-transitory computer-readable medium described herein, transmitting the first HARQ feedback portion and the second HARQ feedback portion of the HARQ feedback message with the PUSCH message may include operations, features, means, or instructions for allocating a subset of the maximum amount of the second quantity of REs for the second HARQ feedback portion based on the second quantity of bits, where the subset may be the second quantity of REs and may be less than or equal to the maximum amount of the second quantity of REs and transmitting the third quantity of REs with the PUSCH message in accordance with the rate-matching procedure, where the puncturing procedure may be based on the subset of the maximum amount of the second quantity of REs.

In some examples of the method, UEs, and non-transitory computer-readable medium described herein, transmitting the first HARQ feedback portion and the second HARQ feedback portion of the HARQ feedback message with the PUSCH message may include operations, features, means, or instructions for transmitting the second HARQ feedback portion of the HARQ feedback message with the PUSCH message in accordance with a rate-matching procedure based on a last of the one or more PDSCH messages preceding the transmission of the PUSCH message by a threshold time that may be associated with the two-part HARQ feedback reporting scheme, where the rate-matching procedure may be based on the first quantity of REs and the second quantity of REs in accordance with the second HARQ feedback portion reporting scheme.

In some examples of the method, UEs, and non-transitory computer-readable medium described herein, the threshold time may be based on a quantity of symbols associated with a capability of the UE.

In some examples of the method, UEs, and non-transitory computer-readable medium described herein, application of the second HARQ feedback portion reporting scheme may be based on the PUSCH message including an uplink transport block.

In some examples of the method, UEs, and non-transitory computer-readable medium described herein, the one or more PDSCH messages may be a first set of PDSCH messages and the method, apparatuses, and non-transitory computer-readable medium may include further operations, features, means, or instructions for receiving a second set of PDSCH messages for which additional HARQ feedback may be scheduled to overlap with the transmission of the PUSCH message, where the second set of PDSCH messages may be received before the transmission of the PUSCH message by less than the threshold time that may be associated with the two-part HARQ feedback reporting scheme and transmitting the additional HARQ feedback with the first quantity of REs in accordance with a single-part HARQ feedback reporting scheme.

In some examples of the method, UEs, and non-transitory computer-readable medium described herein, the HARQ feedback associated with the first set of PDSCH messages may be associated with a first downlink assignment indicator (DAI) counting process and a first HARQ sub-codebook, and the additional HARQ feedback associated with the second set of PDSCH messages may be associated with a second DAI counting process and a second HARQ sub-codebook.

In some examples of the method, UEs, and non-transitory computer-readable medium described herein, application of the second HARQ feedback portion reporting scheme may be based on the PUSCH message including an uplink transport block.

A method for wireless communications by a network entity is described. The method may include transmitting one or more PDSCH messages for which HARQ feedback is scheduled to be reported, where reporting of the HARQ feedback is scheduled to overlap with transmission of an PUSCH message, and where the HARQ feedback is configured to be reported, at least in part, in accordance with a two-part HARQ feedback reporting scheme for reporting a HARQ feedback message that includes a first HARQ feedback portion corresponding to a first quantity of bits that is fixed and a second HARQ feedback portion corresponding to a second quantity of bits that is variable based on a content of the first HARQ feedback portion, receiving the first HARQ feedback portion of the HARQ feedback message with the PUSCH message on the first quantity of REs and the second HARQ feedback portion of the HARQ feedback message with the PUSCH message on the second quantity of REs, the second HARQ feedback portion transmitted in accordance with at least a rate-matching procedure or a puncturing procedure, where a first quantity of REs is based on the first quantity of bits, and where a second quantity of REs is based on the second quantity of bits or a maximum amount of the second quantity of bits in accordance with a second HARQ feedback portion reporting scheme, and decoding the HARQ feedback message in accordance with the second HARQ feedback portion reporting scheme.

A network entity for wireless communications is described. The network entity may include one or more memories storing processor executable code, and one or more processors coupled with the one or more memories. The one or more processors may individually or collectively operable to execute the code to cause the network entity to transmit one or more PDSCH messages for which HARQ feedback is scheduled to be reported, where reporting of the HARQ feedback is scheduled to overlap with transmission of an PUSCH message, and where the HARQ feedback is configured to be reported, at least in part, in accordance with a two-part HARQ feedback reporting scheme for reporting a HARQ feedback message that includes a first HARQ feedback portion corresponding to a first quantity of bits that is fixed and a second HARQ feedback portion corresponding to a second quantity of bits that is variable based on a content of the first HARQ feedback portion, receive the first HARQ feedback portion of the HARQ feedback message with the PUSCH message on the first quantity of REs and the second HARQ feedback portion of the HARQ feedback message with the PUSCH message on the second quantity of REs, the second HARQ feedback portion transmitted in accordance with at least a rate-matching procedure or a puncturing procedure, where a first quantity of REs is based on the first quantity of bits, and where a second quantity of REs is based on the second quantity of bits or a maximum amount of the second quantity of bits in accordance with a second HARQ feedback portion reporting scheme, and decode the HARQ feedback message in accordance with the second HARQ feedback portion reporting scheme.

Another network entity for wireless communications is described. The network entity may include means for transmitting one or more PDSCH messages for which HARQ feedback is scheduled to be reported, where reporting of the HARQ feedback is scheduled to overlap with transmission of an PUSCH message, and where the HARQ feedback is configured to be reported, at least in part, in accordance with a two-part HARQ feedback reporting scheme for reporting a HARQ feedback message that includes a first HARQ feedback portion corresponding to a first quantity of bits that is fixed and a second HARQ feedback portion corresponding to a second quantity of bits that is variable based on a content of the first HARQ feedback portion, means for receiving the first HARQ feedback portion of the HARQ feedback message with the PUSCH message on the first quantity of REs and the second HARQ feedback portion of the HARQ feedback message with the PUSCH message on the second quantity of REs, the second HARQ feedback portion transmitted in accordance with at least a rate-matching procedure or a puncturing procedure, where a first quantity of REs is based on the first quantity of bits, and where a second quantity of REs is based on the second quantity of bits or a maximum amount of the second quantity of bits in accordance with a second HARQ feedback portion reporting scheme, and means for decoding the HARQ feedback message in accordance with the second HARQ feedback portion reporting scheme.

A non-transitory computer-readable medium storing code for wireless communications is described. The code may include instructions executable by one or more processors to transmit one or more PDSCH messages for which HARQ feedback is scheduled to be reported, where reporting of the HARQ feedback is scheduled to overlap with transmission of an PUSCH message, and where the HARQ feedback is configured to be reported, at least in part, in accordance with a two-part HARQ feedback reporting scheme for reporting a HARQ feedback message that includes a first HARQ feedback portion corresponding to a first quantity of bits that is fixed and a second HARQ feedback portion corresponding to a second quantity of bits that is variable based on a content of the first HARQ feedback portion, receive the first HARQ feedback portion of the HARQ feedback message with the PUSCH message on the first quantity of REs and the second HARQ feedback portion of the HARQ feedback message with the PUSCH message on the second quantity of REs, the second HARQ feedback portion transmitted in accordance with at least a rate-matching procedure or a puncturing procedure, where a first quantity of REs is based on the first quantity of bits, and where a second quantity of REs is based on the second quantity of bits or a maximum amount of the second quantity of bits in accordance with a second HARQ feedback portion reporting scheme, and decode the HARQ feedback message in accordance with the second HARQ feedback portion reporting scheme.

In some examples of the method, network entities, and non-transitory computer-readable medium described herein, a maximum amount of the second quantity of bits may be independent of the content of the first HARQ feedback portion and the second HARQ feedback portion reporting scheme defines that the second quantity of REs may be based on the maximum amount of the second quantity of bits.

In some examples of the method, network entities, and non-transitory computer-readable medium described herein, the second quantity of REs may be based on a quantity of CRC bits corresponding to the maximum amount of the second quantity of bits.

In some examples of the method, network entities, and non-transitory computer-readable medium described herein, the second quantity of REs may be populated with a sequence of values that may be based on the second quantity of bits being zero.

In some examples of the method, network entities, and non-transitory computer-readable medium described herein, receiving the first HARQ feedback portion and the second HARQ feedback portion of the HARQ feedback message with the PUSCH message may include operations, features, means, or instructions for receiving the second HARQ feedback portion of the HARQ feedback message with the PUSCH message in accordance with the rate-matching procedure and a puncturing procedure, where the puncturing procedure may be based on the second quantity of REs in accordance with the second HARQ feedback portion reporting scheme.

In some examples of the method, network entities, and non-transitory computer-readable medium described herein, the rate-matching procedure may be based on the first quantity of REs.

In some examples of the method, network entities, and non-transitory computer-readable medium described herein, receiving the first HARQ feedback portion and the second HARQ feedback portion of the HARQ feedback message with the PUSCH message may include operations, features, means, or instructions for receiving the second HARQ feedback portion of the HARQ feedback message with the PUSCH message in accordance with a rate-matching procedure based on a last of the one or more PDSCH messages preceding transmission, to the network entity, of the PUSCH message by a threshold time that may be associated with the two-part HARQ feedback reporting scheme, where the rate-matching procedure may be based on the first quantity of REs and the second quantity of REs in accordance with the second HARQ feedback portion reporting scheme.

In some examples of the method, network entities, and non-transitory computer-readable medium described herein, the threshold time may be based on a quantity of symbols associated with a capability of a UE.

In some examples of the method, network entities, and non-transitory computer-readable medium described herein, the one or more PDSCH messages may be a first set of PDSCH messages and the method, apparatuses, and non-transitory computer-readable medium may include further operations, features, means, or instructions for transmitting a second set of PDSCH messages for which additional HARQ feedback may be scheduled to overlap with the transmission of the PUSCH message, where the second set of PDSCH messages may be transmitted before the transmission of the PUSCH message by less than the threshold time that may be associated with the two-part HARQ feedback reporting scheme and receiving the additional HARQ feedback with the first quantity of REs in accordance with a single-part HARQ feedback reporting scheme.

In some examples of the method, network entities, and non-transitory computer-readable medium described herein, the HARQ feedback associated with the first set of PDSCH messages may be associated with a first downlink assignment indicator (DAI) counting process and a first HARQ sub-codebook, and the additional HARQ feedback associated with the second set of PDSCH messages may be associated with a second DAI counting process and a second HARQ sub-codebook.

BRIEF DESCRIPTION OF THE DRAWINGS

FIGS. 16 through 20 show flowcharts illustrating methods that support multiplexing two-part HARQ feedback on an uplink shared channel in accordance with one or more aspects of the present disclosure.

DETAILED DESCRIPTION

Figure 1:
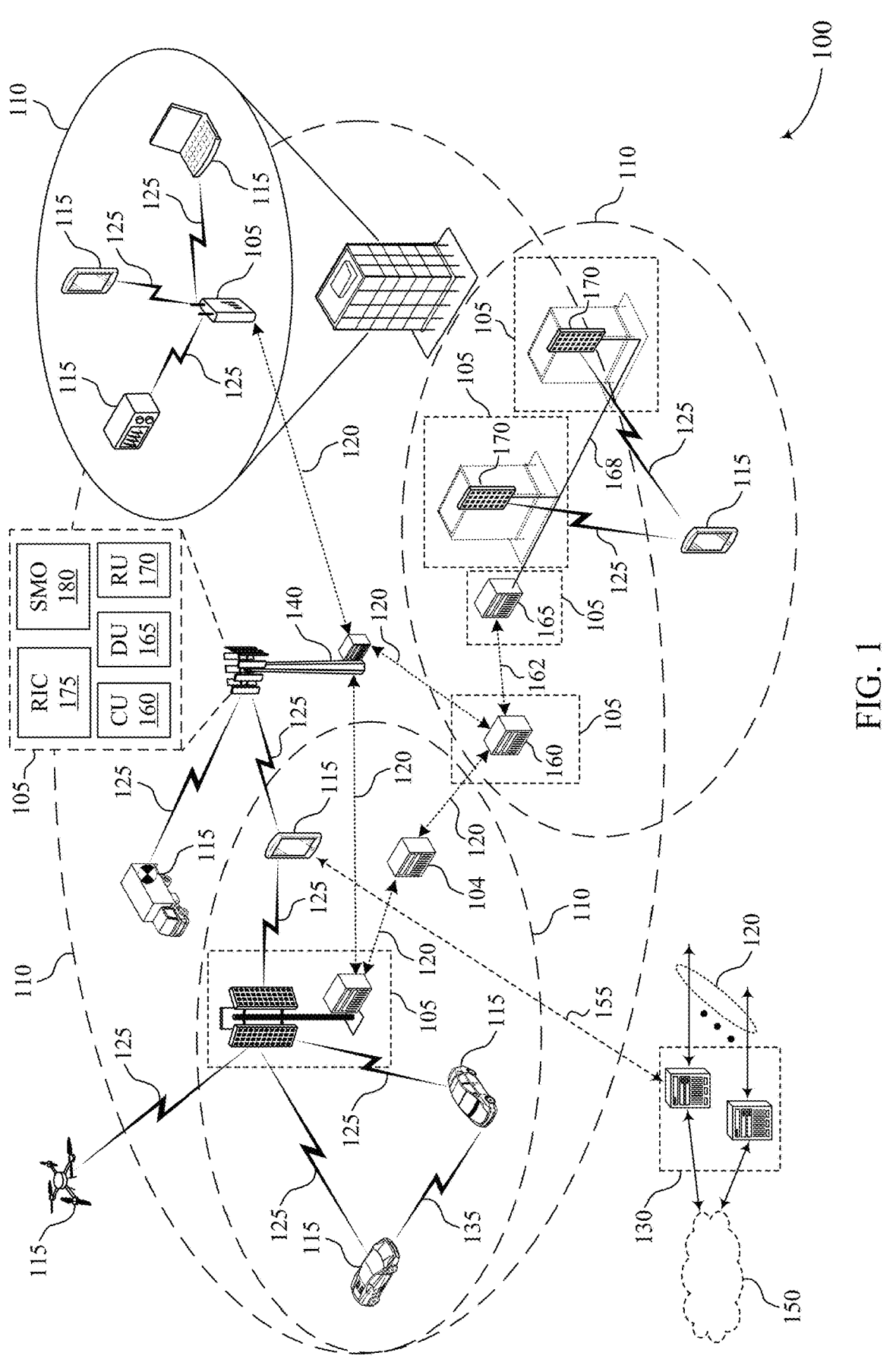
FIG. 1 shows an example of a wireless communications system that supports multiplexing two-part hybrid automatic repeat request (HARQ) feedback on an uplink shared channel in accordance with one or more aspects of the present disclosure.

In some wireless communications systems, a user equipment (UE) may multiplex uplink control information (UCI) on a physical uplink shared channel (PUSCH). In some implementations, the UE also may multiplex feedback (hybrid automatic repeat request (HARQ) acknowledgment (ACK) feedback) on the PUSCH. The UE may support two-part HARQ feedback to compress the feedback and minimize an average payload size of HARQ transmissions, which may reduce signaling overhead. For example, the UE may separately encode and transmit a HARQ payload in two parts (e.g., a first portion or part and a second portion or part). The UE may have information regarding the size of a HARQ codebook after decoding last-received downlink control information (DCI) associated with the HARQ codebook. So, when the UE multiplexes the HARQ codebook on a PUSCH, the UE may begin a PUSCH rate-matching procedure as soon as it decodes the last DCI (e.g., because at that time, the UE may know the size of the HARQ codebook and thus, a quantity of resource elements (REs) of the PUSCH that the HARQ feedback occupies). However, if the HARQ feedback is two-part HARQ feedback, a size of the second portion may depend on the decoding result of the PDSCHs. That is, the UE may lack knowledge regarding the size of the second portion before processing the last PDSCH and therefore, may have too little time to perform the PUSCH rate-matching procedure after processing the last PDSCH.

The techniques described herein may support procedures for multiplexing two-part HARQ feedback on a PUSCH. A UE may receive one or more PDSCH messages for which the UE may be scheduled to report HARQ feedback. The HARQ feedback may be scheduled to overlap with transmission of a PUSCH message. As described herein, the UE may be configured to report the HARQ feedback according to a two-part HARQ feedback reporting scheme, in which the HARQ feedback may include a first portion (e.g., first part) corresponding to a first quantity of bits that is fixed and a second portion (e.g., second part) corresponding to a second quantity of bits that is variable (e.g., a maximum quantity of bits based on whether the first portion includes ACK feedback or ACK and NACK feedback). In addition, the UE may determine a first quantity of REs based on the first quantity of bits and a second quantity of REs based on the second quantity of bits or a maximum number of the second quantity of bits. That is, the first and second quantities of REs may correspond to the respective portions of the two-part HARQ feedback.

The UE may transmit the HARQ feedback with the PUSCH message. For example, the UE may transmit the first portion with the PUSCH message on the first quantity of REs and the second portion with the PUSCH message on the second quantity of REs (such that the HARQ feedback is multiplexed on the PUSCH message). In some examples, the UE may transmit the second portion in according to a rate-matching procedure, a puncturing procedure, or both. For example, the UE may transmit the second portion according to a rate-matching procedure that is based on the first quantity of REs and a puncturing procedure that is based on the second quantity of REs. Alternatively, the UE may transmit the second portion according to a rate-matching procedure that is based on the last-received PDSCH message preceding the PUSCH message transmission by some threshold time, where the rate-matching procedure is then based on the first and second quantities of REs.

Aspects of the disclosure are initially described in the context of wireless communications systems. Aspects of the disclosure are then described in the context of multiplexing timelines, PDSCH transformations, and process flows. Aspects of the disclosure are further illustrated by and described with reference to apparatus diagrams, system diagrams, and flowcharts that relate to multiplexing two-part HARQ feedback on an uplink shared channel.

FIG. 1 shows an example of a wireless communications system 100 that supports multiplexing two-part HARQ feedback on an uplink shared channel in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support multiplexing two-part HARQ feedback on an uplink shared channel as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. HARQ feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The wireless communications system 100 may support techniques for multiplexing two-part HARQ feedback on a PUSCH. A UE 115 may receive one or more PDSCH messages for which the UE 115 may be scheduled to report HARQ feedback. The HARQ feedback may be scheduled to overlap with transmission of a PUSCH message. In addition, the UE 115 may be configured to report the HARQ feedback according to a two-part HARQ feedback reporting scheme, in which the HARQ feedback may include a first portion (e.g., first part) corresponding to a first quantity of bits that is fixed and a second portion (e.g., second part) corresponding to a second quantity of bits that is variable (e.g., a maximum quantity of bits based on whether the first portion includes ACK feedback or ACK and NACK feedback). In addition, the UE 115 may determine a first quantity of REs based on the first quantity of bits and a second quantity of REs based on the second quantity of bits or a maximum number of the second quantity of bits. That is, the first and second quantities of REs may correspond to the respective portions of the two-part HARQ feedback.

The UE 115 may transmit the HARQ feedback with the PUSCH message. For example, the UE 115 may transmit the first portion with the PUSCH message on the first quantity of REs and the second portion with the PUSCH message on the second quantity of REs (such that the HARQ feedback is multiplexed on the PUSCH message). In some examples, the UE 115 may transmit the second portion in according to a rate-matching procedure, a puncturing procedure, or both. For example, the UE 115 may transmit the second portion according to a rate-matching procedure that is based on the first quantity of REs and a puncturing procedure that is based on the second quantity of REs. Alternatively, the UE 115 may transmit the second portion according to a rate-matching procedure that is based on the last-received PDSCH message preceding the PUSCH message transmission by some threshold time, where the rate-matching procedure is then based on the first and second quantities of REs.

Figure 2:
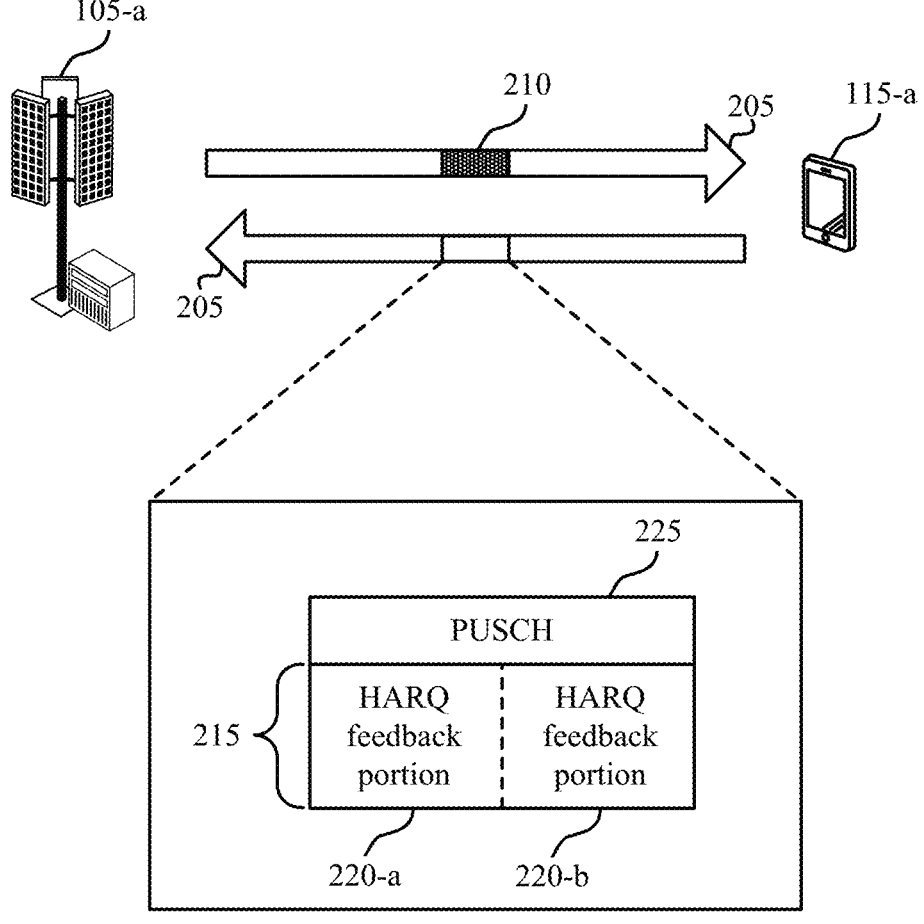
FIG. 2 shows an example of a wireless communications system that supports multiplexing two-part HARQ feedback on an uplink shared channel in accordance with one or more aspects of the present disclosure.

FIG. 2 shows an example of a wireless communications system 200 that supports multiplexing two-part HARQ feedback on an uplink shared channel in accordance with one or more aspects of the present disclosure. In some examples, the wireless communications system 200 may implement aspects of the wireless communications system 100 or may be implemented by aspects of the wireless communications system 100. For example, the wireless communications system 200 may include a UE 115-*a* and a network entity 105-*a*, which may be examples of corresponding devices described herein. The wireless communications system 200 may support uplink and downlink communications between the UE 115-*a* and the network entity 105-*a* via communication links 205, which may be examples of a communication link 125 as described herein with reference to FIG. 1.

The UE 115-*a* may support UCI multiplexing on a PUSCH 225. To determine one or more PUSCH resources over which the UE 115-*a* may multiplex the UCI, the UE 115-$a$ may first determine a quantity of REs in the PUSCH 225 available for a UCI transmission (where the PUSCH 225 may include some REs for uplink transport blocks and some REs for the UCI transmission). In determining the quantity of REs, the UE 115-$a$ may determine a quantity of bits for a rate-matching output and for encoding the channel. In some examples, the quantity of REs for the UCI may be represented as Q', a quantity of coded modulation symbols per layer. The UE 115-$a$ may determine Q' first for HARQ-ACK feedback, then for CSI part 1, then for CSI part 2. For example, for HARQ-ACK feedback in cases where the PUSCH 225 includes an uplink transport block or an uplink shared channel (UL-SCH), the UE 115-$a$ may calculate the quantity of RES Q'$_{ACK}$ according to Equation 1.

$$Q'_{ACK} = \min\left\{ \left\lceil \frac{(O_{ACK} + L_{ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha \cdot \sum_{l=l_0}^{N_{symb,all}^{PUSCH}-1} M_{sc}^{UCI}(l) \right\rceil \right\} \quad (1)$$

Using Equation 1, the UE 115-$a$ may use a minimum of two values to determine Q'$_{ACK}$. In a first value, O$_{ACK}$ may represent a payload (e.g., quantity of bits) corresponding to the HARQ-ACK feedback, L$_{ACK}$ may represent a quantity of CRC bits associated with the HARQ-ACK feedback, O$_{ACK}$+L$_{ACK}$ may represent a size of the HARQ-ACK feedback, $$\beta_{offset}^{PUSCH}$$

may represent a spectral efficiency ratio of the PUSCH 225 to the UCI (e.g., RRC-configured or dynamically indicated in the DCI scheduling the PUSCH 225), $$\sum_{l=0}^{N_{symb,all}^{PUSCH}-1} M_{sc}^{UCI}(l)$$

may represent a total quantity of PUSCH RES, and $$\sum_{r=0}^{C_{UL-SCH}-1} K_r$$

may represent a quantity of information bits for the UL-SCH (e.g., uplink data). In addition, in a second value, a may represent a scaling factor to limit the quantity of REs assigned to UCI on the PUSCH 225, and $$\sum_{l=l_0}^{N_{symb,all}^{PUSCH}-1} M_{sc}^{UCI}(l)$$

may indicate a maximum quantity of REs the UE 115-$a$ may use for the UCI.

Alternatively, in some cases, the PUSCH 225 may lack an uplink transport block or an UL-SCH. In such cases, the UE 115-$a$ may calculate the quantity of REs Q'$_{ACK}$ by using the minimum of two values according to Equation 2

$$Q'_{ACK} = \min\left\{ \left\lceil \frac{(O_{ACK} + L_{ACK}) \cdot \beta_{offset}^{PUSCH}}{R \cdot Q_m} \right\rceil, \left\lceil \alpha \cdot \sum_{l=l_0}^{N_{symb,all}^{PUSCH}-1} M_{sc}^{UCI}(l) \right\rceil \right\} \quad (2)$$

In Equation 2, O$_{ACK}$ may represent a payload (e.g., quantity of bits) of the HARQ-ACK feedback, L$_{ACK}$ may represent a quantity of CRC bits associated with the HARQ-ACK feedback, O$_{ACK}$+L$_{ACK}$ may represent a size of the HARQ-ACK feedback, $$\beta_{offset}^{PUSCH}$$

may represent a spectral efficiency ratio of the PUSCH 225 to the UCI, R may represent a coding rate, Q$_m$ may represent a modulation order (where the coding rate and the modulation order may be provided in the DCI that schedules the PUSCH 225). In addition, in a second value, a may represent a scaling factor to limit the quantity of REs assigned to UCI on the PUSCH 225, and $$\sum_{l=0}^{N_{symb,all}^{PUSCH}-1} M_{sc}^{UCI}(l)$$

may indicate a maximum quantity of REs the UE 115-$a$ may use for the UCI.

After calculating Q'$_{ACK}$, the UE 115-$a$ may encode the UCI, perform a rate-matching procedure, and modulate the UCI. In addition, the UE 115-$a$ may map the modulated symbols of the UCI to some of the REs of the PUSCH 225 that the UE 115-$a$ determined to be for the UCI transmission. In some examples, the RE mapping may be based on a set of rules and may depend on UCI types and PUSCH DMRS symbol locations, among other factors. The UE 115-$a$ may multiplex each UCI that overlaps with the PUSCH 225 in this way (e.g., first for HARQ-ACK, then for CSI part 1, then for CSI part 2). In addition, the UE 115-$a$ may use a same modulation order and a same quantity of layers (e.g., which may be indicated in DCI that schedules the PUSCH 225) for the PUSCH 225 and the UCI.

In some implementations, when the UE 115-$a$ multiplexes UCI on the PUSCH, a rate-matching procedure for uplink transport blocks may be based on a difference between a total quantity of REs (e.g., excluding those for DMRSs and phase-tracking reference signals (PTRSs)) and a quantity of REs determined for UCI multiplexing (e.g., Q'). As a result, the UE 115-$a$ may begin performing the rate-matching procedure once it knows the quantity of REs occupied by the UCI transmission (which the UE 115-$a$ may determine based on the payload size of the UCI, a beta offset, and other factors described herein, e.g., with reference to Equation 1 and Equation 2).

In some examples, the UE 115-$a$ may transmit a PUSCH or a PUCCH according to a particular timeline. In some examples, the UE 115-$a$ may expect that a first symbol S$_0$ of an earlier PUCCH or PUSCH of a group of overlapping PUCCHs and PUSCHs in the slot (e.g., a reference symbol) satisfies a set of timeline conditions. For example, the conditions may specify that S$_0$ occur after a symbol with a CP starting after a time $$T_{proc,1}^{mux}$$

after a last symbol of any corresponding PDSCH, where $$T_{proc,1}^{mux}$$

may be based on an $N_1$ timeline related to a PDSCH processing capability of the UE 115-*a*. In addition, the conditions may specify that $S_0$ occur after a symbol with a CP starting after $$T_{proc,2}^{mux}$$

after a last symbol of any PDCCH with the DCI format scheduling an overlapping PUSCH and any PDCCH providing a DCI format with corresponding HARQ-ACK information in an overlapping PUCCH in the slot, where $$T_{proc,2}^{mux}$$

may be based on an N2 timeline related to a PUSCH processing capability of the UE 115-*a*. As such, the UE 115-*a* may transmit a PUCCH based on a timeline associated with a corresponding scheduling DCI $$\left(\text{e.g., } T_{proc,2}^{mux}\right)$$

and a timeline associated with a corresponding PDSCH transmission $$\left(\text{e.g., } T_{proc,1}^{mux}\right),$$

and the UE 115-*a* may transmit a PUSCH based on a timeline associated with a corresponding scheduling DCI $$\left(\text{e.g., } T_{proc,1}^{mux}\right).$$

In NR systems, if a HARQ-ACK codebook includes N bits, the $2^N$ codepoints may not be equally likely. This may be due to a BLER target being less than or equal to 10%, correlations in a time domain, a frequency domain, or across layers (e.g., across slots, codebook groups, component carriers, transport blocks), or any combination thereof. As such, the UE 115-*a* may utilize compression techniques to minimize an average HARQ-ACK payload size. For example, two-part HARQ-ACK feedback (which may be analogous to a two-part CSI in NR systems) may achieve such compression, in which the UE 115-*a* may encode the two portions (parts) separately and the network entity 105-*a* may decode the first portion before decoding the second portion. The first portion may have a fixed size (e.g., a fixed quantity of bits), and the size and interpretation of the second portion may depend on the indicated codepoint of the first portion.

To transmit a HARQ-ACK payload in two portions that are separately encoded, the UE 115-*a* may assume that an original HARQ-ACK codebook $x^N$ includes N bits, and thus that the first portion $$x_1^{N_1}$$

may include N bits and the second part $$x_2^{N_2}$$

may include $N_2$ bits. $N_1$ may be a fixed value and is not a function of $x^N$. As such, the first portion may have a fixed size (length) for a given N. $N_2$ may be a variable value as a function of $$x_1^{N_1}.$$

As such, the second portion may have a variable size (length) depending on the first portion. For example, the HARQ-ACK feedback may include four bits with BLER=10%. The first portion may include one bit, and the second portion may include zero or four bits. If the payload just includes ACK feedback, the UE 115-*a* may include a "1" (a single bit with a value of 1) in the first portion and nothing (zero bits) in the second portion. In such cases, the UE 115-*a* may transmit a one-bit HARQ-ACK payload with a probability of 0.6561. Otherwise, the UE 115-*a* may include a "0" (a single bit with a value of 0) in the first portion and the full four bits in the second portion to indicate the appropriate feedback. In such cases, the UE 115-*a* may transmit a five-bit HARQ-ACK payload with a probability of 0.3439. Thus, on average (if the UE 115-*a* transmits the one-bit payload 65.61% of the time and the five-bit payload 34.39% of the time), the UE 115-*a* may transmit 2.3756 bits on average. The network entity 105-*a* may receive the two-part HARQ-ACK payload and first decode the first portion. The network entity 105-*a* may determine the size or length of the second portion based on decoding the first portion and decode the second portion. The network entity 105-*a* may then determine the original HARQ-ACK codebook based on decoding the first and second portions.

In some examples of one-part HARQ-ACK payloads, the UE 115-*a* may know the size of a HARQ-ACK codebook after it decodes last DCI associated with the HARQ-ACK codebook. The decoding results of PDSCHs (including the PDSCH scheduled by the last DCI) may not impact the size of the HARQ-ACK codebook. When the UE 115-*a* multiplexes the HARQ-ACK codebook on a PUSCH, the UE 115-*a* may begin a PUSCH rate-matching procedure as soon as it decodes the last received DCI as well as the DCI scheduling the PUSCH. As such, based on decoding the last DCI, the UE 115-*a* may know the size of the HARQ-ACK codebook and therefore may know the quantity of REs occupied by the HARQ-ACK on the PUSCH. Based on knowing the quantity of REs, the UE 115-*a* may identify the PUSCH REs that carry uplink transport blocks and therefore, the UE 115-*a* may begin the PUSCH rate-matching procedure for the uplink transport block.

However, for two-part HARQ-ACK payloads, the size of the second portion of the two-part HARQ-ACK may depend on the decoding result of the PDSCHs. As such, the UE 115-*a* may lack knowledge of the size of the second portion before processing the last received PDSCH. Put another way, the UE 115-*a* may identify the quantity of PUSCH REs carrying the second portion (and therefore, the REs carrying an uplink transport block) only after processing the last PDSCH, and the UE 115-*a* may begin PUSCH rate-matching only after processing the last received PDSCH. Some wireless communications may support insufficient timelines for PUSCH rate-matching in cases with two-part HARQ-ACK payloads (e.g., the UE 115-*a* may have too little time for PUSCH rate-matching procedures).

The wireless communications system 200 may support techniques that enable the UE 115-*a* to perform a PUSCH rate-matching procedure when the UE 115-*a* multiplexes the two-part HARQ feedback 215 on the PUSCH 225. The UE 115-*a* may receive one or more PDSCH messages 210 from the network entity 105-*a* for which the UE 115-*a* is scheduled to report HARQ feedback 215. The reporting of the HARQ feedback 215 may be scheduled to overlap with transmission of the PUSCH 225, such that the UE 115-*a* may be to multiplex the HARQ feedback 215 and the PUSCH 225. In addition, the HARQ feedback 215 may be associated with a two-part HARQ feedback reporting scheme. That is, the HARQ feedback 215 may include a first HARQ feedback portion 220-*a* (e.g., a first part) and a second HARQ feedback portion 220-*b* (e.g., a second part). The first HARQ feedback portion 220-*a* may correspond to a first quantity of bits (e.g., N2 bits) that is fixed and the second HARQ feedback portion 220-*b* may correspond to a second quantity of bits (e.g., N2 bits) that is variable, in some cases based on the content of the first HARQ feedback portion 220-*a*. For example, the quantity of bits or size of the second HARQ feedback portion 220-*b* may depend on whether the first HARQ feedback portion 220-*a* includes ACK feedback or ACK and NACK feedback.

In some examples, the UE 115-*a* may determine a first quantity of REs of the PUSCH 225 based on the first quantity of bits. Thus, the first quantity of REs may correspond to the first HARQ feedback portion 220-*a*. In addition, according to a second HARQ feedback portion reporting scheme, the UE 115-*a* may determine a second quantity of REs of the PUSCH 225 based on the second quantity of bits or a maximum amount of the second quantity of bits. Thus, the second quantity of REs may correspond to the second HARQ feedback portion 220-*b*.

In some implementations, the UE 115-*a* may determine the second quantity of REs for multiplexing the second HARQ feedback portion 220-*b* assuming the maximum amount of the second quantity of bits, where the second HARQ feedback portion reporting scheme may define that the second quantity of REs may be based on the maximum amount (and independent of the content of the first HARQ feedback portion 220-*a*). In such cases, the quantity of REs for multiplexing the HARQ feedback 215 on the PUSCH 225 may no longer be a function of PDSCH decoding results. In determining the second quantity of REs based on a maximum amount of bits for the second HARQ feedback portion 220-*b*, the UE 115-*a* may effectively assume that each of the bits indicates a NACK or that the first set of bits of the first HARQ feedback portion 220-*a* includes all zeros. In this way, the payload size of the second HARQ feedback portion 220-*b* may be maximized if the original HARQ-ACK codebook (on which the two-part HARQ feedback 215 is based) includes all NACKs.

In some examples, the UE 115-*a* may determine the maximum amount of the second quantity of bits, $Q'_{ACK-2}$, according to Equation 3.

$$Q'_{ACK-2} = \min \left\{ \left\lceil \frac{(O^{max}_{ACK-2} + L^{max}_{ACK-2}) \cdot \beta^{PUSCH}_{offset} \cdot \sum_{l=0}^{N^{PUSCH}_{symb,all}-1} M^{UCI}_{sc}(l)}{\sum_{r=0}^{C_{UL-SCH}-1} K_r} \right\rceil, \right. \quad (3)$$

-continued $$\left. \left\lceil \alpha \cdot \sum_{l=i_0}^{N^{PUSCH}_{symb,all}-1} M^{UCI}_{sc}(l) \right\rceil - Q'_{ACK-1} \right\}$$

Using Equation 3, the UE 115-*a* may use a minimum of two values to determine $Q'_{ACK-2}$. In a first value, $$O^{max}_{ACK-2}$$

may represent a maximum payload (quantity of bits) corresponding to the second HARQ feedback portion 220-*b*.

$$L^{max}_{ACK-2}$$

may represent a quantity of CRC bits corresponding to the maximum amount of the second quantity of bits associated with the second HARQ feedback portion 220-*b*, where the CRC length may generally depend on a UCI payload size. As such, in Equation 3, $$L^{max}_{ACK-2}$$

may be determined based on assuming $$O^{max}_{ACK-2}$$

bits for the second HARQ feedback portion 220-*b* (while an actual CRC length may be different given that the actual size of the second HARQ feedback portion 220-*b* may be different). In addition, $$O^{max}_{ACK-2} + L^{max}_{ACK-2}$$

may represent a maximum size of the second HARQ feedback portion 220-*b*, $$\beta^{PUSCH}_{offset}$$

may represent a spectral efficiency ratio of the PUSCH 225 to the UCI (e.g., RRC-configured or dynamically indicated in the DCI scheduling the PUSCH 225), $$\sum_{l=0}^{N^{PUSCH}_{symball}-1} M^{UCI}_{sc}(l)$$

may represent a total quantity of PUSCH REs, and $$\sum_{r=0}^{C_{UL-SCH}-1} K_r$$

may represent a quantity of information bits for the UL-SCH (e.g., uplink data). In addition, in a second value, $\alpha$ may represent a scaling factor to limit the quantity of REs assigned to UCI on the PUSCH 225, $$\sum_{l=l_0}^{N_{symb,all}^{PUSCH}-1} M_{sc}^{UCI}(l)$$

may indicate a maximum quantity of REs the UE 115-*a* may use for the UCI, and $Q'_{ACK-1}$ may represent a quantity of bits of the first HARQ feedback portion 220-*a*.

Based on Equation 3, encoding and rate-matching of the UCI may be based on the actual amount of the second quantity of bits (e.g., $O_{ACK-2}+L_{ACK-2}$), while the second quantity of REs (e.g., the length of the output after UCI rate-matching) may be based on the maximum amount of the second quantity of bits $$(\text{e.g., } O_{ACK-2}^{max} + L_{ACK-2}^{max}).$$

As such, the coding rate of the second HARQ feedback portion 220-*b* may become small on average (e.g., as the average length of the second HARQ feedback portion 220-*b* may be much smaller than the maximum amount of the second quantity of bits). Thus, the described techniques may reduce average HARQ-ACK overhead (e.g., reduce an average HARQ-ACK payload size) and therefore reduce average code rates of HARQ-ACK feedback when multiplexed on a PUSCH 225 (instead of reducing the average quantity of PUSCH REs used for multiplexing the HARQ-ACK without the described techniques).

In some examples, using the maximum amount of the second quantity of bits to determine the second quantity of REs may be subject to some conditions. For example, the conditions may specify that the PUSCH 225 transmission includes an uplink shared channel (e.g., uplink transport block). For example, if the PUSCH 225 carries the first HARQ feedback portion 220-*a*, the second HARQ feedback portion 220-*b*, and CSI, the second quantity of REs for the second HARQ feedback portion 220-*b* may still be based on the actual amount instead of the maximum amount of the second quantity of bits. In addition, the conditions may specify that a last of the one or more PDSCH messages 210 for which the UE 115-*a* may report HARQ-ACK feedback may fail to satisfy a timeline sufficient for multiplexing the two-part HARQ feedback 215 and the PUSCH 225 as described herein. That is, the UE 115-*a* may apply the second HARQ feedback portion reporting scheme based on receiving a last (e.g., most recently received) of the one or more PDSCH messages 210 less than a threshold duration of time prior to the transmission of the PUSCH 225. If this condition is unsatisfied, the UE 115-*a* may have enough time to perform a PUSCH rate-matching procedure even if the second quantity of REs is based on the actual amount of the second quantity of bits. The second condition, specifically as related to the threshold duration of time, is descried herein with reference to FIG. 3.

In some examples, if the UE 115-*a* determines that the actual quantity of bits for the second HARQ feedback portion 220-*b* is zero (e.g., when all PDSCH decoding results are ACK), the UE 115-*a* may populate the second quantity of REs with a particular sequence of values. For example, the UE 115-*a* may fill the second quantity of REs with a known or predetermined sequence, or the UE 115-*a* may replace the payload of the second HARQ feedback portion 220-*b* with a known or specified payload. Then, the network entity 105-*a* may treat the second quantity of REs as pilot REs in addition to DMRSs and/or PTRSs to enhance channel estimations. Alternatively, the UE 115-*a* may refrain from transmitting the second quantity of REs (e.g., the second quantity of REs may remain empty and thus, may be excluded from the HARQ feedback message).

After determining the first and second quantity of REs, the UE 115-*a* may transmit the HARQ feedback 215 with the PUSCH 225. For example, the UE 115-*a* may transmit the first HARQ feedback portion 220-*a* with the PUSCH 225 on the first quantity or REs and the second HARQ feedback portion 220-*b* with the PUSCH 225 on the second quantity of REs. The UE 115-*a* may transmit the second HARQ feedback portion 220-*b* according to a rate-matching procedure, a puncturing procedure, or both.

Alternatively, in determining the second quantity of REs and transmitting the HARQ feedback 215, the UE 115-*a* may determine that the second quantity of REs has no impact on PUSCH rate-matching. That is, the UE 115-*a* may determine that the PUSCH rate-matching ignores the second HARQ feedback portion 220-*b*. After the UE 115-*a* determines the second quantity of REs, the second quantity of REs may puncture the REs in the PUSCH 225 for the uplink transport block (e.g., the UE 115-*a* may transmit the coded bits of the second HARQ feedback portion 220-*b* on the second quantity of REs instead of on PUSCH data or the uplink transport block). In this way, the UE 115-*a* may transmit the second HARQ feedback portion 220-*b* with the PUSCH 225 according to a rate-matching procedure, which may be based on the first quantity of REs, and the puncturing procedure, which may be based on the second quantity of REs according to the second HARQ feedback reporting scheme.

If CSI is also multiplexed on the PUSCH 225, the UE 115-*a* may refrain from puncturing REs occupied by the CSI in favor of puncturing the REs for data or the uplink transport blocks. The UE 115-*a* may determine which REs are occupied by the CSI (which may be used for PUSCH rate-matching) before knowing which REs are to be punctured by the second HARQ feedback portion 220-*b*. Specifically, after determining that CSI is available for transmission with the PUSCH 225, the UE 115-*a* may determine the maximum amount of the second quantity of bits for the second HARQ feedback portion 220-*b* (e.g., $Q'_{ACK-2}$). Then, the UE 115-*a* may first reserve some REs for possible puncturing by the second HARQ feedback portion 220-*b*. The reserved REs may be based on the maximum amount of the second quantity of bits for the second HARQ feedback portion 220-*b*. In addition, the UE 115-*a* may determine a third quantity of REs for multiplexing the CSI on the PUSCH 225, the third quantity excluding any of the reserved REs. That is, the UE 115-*a* may allocate the third quantity of REs corresponding to the CSI for transmission with the PUSCH 225, where the third quantity of REs are exclusive of the reserved maximum amount of the second quantity of REs. At this point, the UE 115-*a* may begin a PUSCH rate-matching procedure for the uplink transport block (e.g., the UE 115-*a* may rate-match the third quantity of RES for the CSI but not the reserved REs).

Next, the UE 115-*a* may determine and allocate an actual amount of the second quantity of REs for multiplexing the second HARQ feedback portion 220-*b* based on an actual amount of the quantity of bits of the second HARQ feedback portion 220-*b*. The actual amount of the second quantity of REs may be smaller than or equal to the quantity of reserved REs. Thus, the actual amount of the second quantity of REs (e.g., a subset of the reserved REs) may carry the second HARQ feedback portion 220-*b* and puncture the PUSCH data (e.g., the uplink transport block). The UE 115-*a* may transmit the third quantity of REs with the PUSCH 225 in accordance with a rate-matching procedure, where the puncturing procedure may be based on the subset of the maximum amount of the second quantity of REs.

The network entity 105-*a* may receive and decode the HARQ feedback 215 in accordance with the second HARQ feedback portion reporting scheme. That is, the network entity 105-*a* may decode the first HARQ feedback portion 220-*a* and then decode the second HARQ feedback portion 220-*b* based on the first HARQ feedback portion 220-*a*.

Figure 3:
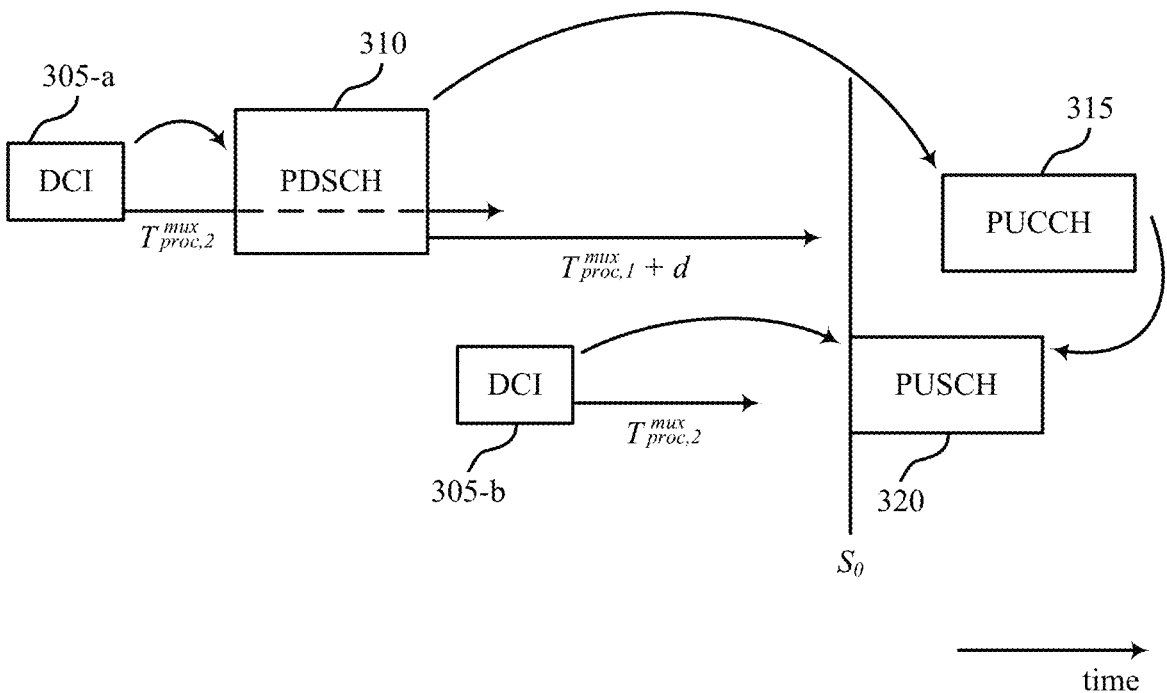
FIGS. 3 and 4A show examples of multiplexing timelines that support multiplexing two-part HARQ feedback on an uplink shared channel in accordance with one or more aspects of the present disclosure.

FIG. 3 shows an example of a multiplexing timeline 300 that supports multiplexing two-part HARQ feedback on an uplink shared channel in accordance with one or more aspects of the present disclosure. In some examples, the multiplexing timeline 300 may implement aspects of the wireless communications systems 100 and 200 or may be implemented by aspects of the wireless communications systems 100 and 200. For example, the multiplexing timeline 300 may represent an extended timeline for UCI multiplexing when a UE 115 multiplexes two-part HARQ feedback (including a first HARQ feedback portion and a second HARQ feedback portion) on a PUSCH 320.

A UE 115 may receive one or more PDSCH messages from network entity for which the UE 115 may be scheduled to report two-part HARQ feedback. The reporting of the two-part HARQ feedback may be scheduled to overlap with transmission of a PUSCH. As described herein with reference to FIG. 2, the first HARQ feedback portion of the two-part HARQ feedback may correspond to a first quantity of bits and the second HARQ feedback portion of the two-part HARQ feedback may correspond to a second quantity of bits. In addition, the UE 115 may determine a first set of REs for the first HARQ feedback portion based on the first set of bits and a second set of REs for the second HARQ feedback portion based on the second set of bits.

The UE 115 may receive DCI 305-*a*, which may schedule a PUCCH 315, and DCI 305-*b*, which may schedule a PUSCH 320. In addition, the UE 115 may receive a PDSCH 310, which the UE 115 may decode. In accordance with the multiplexing timeline 300, the UE 115 may expect that a first symbol $S_0$ of the earliest of the PUCCH 315 and the PUSCH 320, among a group of overlapping PUCCHs and PUSCHs in a slot, is not before a symbol with a CP starting after a time $$T_{proc,1}^{mux} + d$$

that is after a last symbol of any corresponding PDSCH (e.g., the PDSCH 310). That is, the PDSCH 310 may precede transmission of the PUCCH 315 or the PUSCH 320 by a threshold time $$\left( e.g., T_{proc,1}^{mux} + d \right)$$

that is associated with a two-part HARQ reporting scheme. The value of d may represent a timeline relaxation that allows the UE 115 to decode the PDSCH 310 and still have enough time to perform a PUSCH rate-matching procedure. In some examples, d may be indicated as a UE capability in terms of a quantity of symbols that is specific to the multiplexing timeline 300. Alternatively, d may have a value equal to $$T_{proc,2}^{mux},$$

which may be based on a timeline related to a PUSCH processing capability of the UE 115.

Based on the decoding result of the PDSCH 310, the UE 115 may determine the size (e.g., a quantity of bits) of the second HARQ feedback portion, therefore the UE 115 may determine a quantity of REs for multiplexing the second HARQ feedback portion, and therefore the UE 115 may determine a quantity of REs for an uplink transport block. In this way, the UE 115 may transmit the second HARQ feedback portion of the two-part HARQ feedback with the PUSCH 320 in accordance with the rate-matching procedure based on the PDSCH 310 preceding the transmission of the PUSCH 320 by a time $$T_{proc,1}^{mux} + d.$$

The timelines $$T_{proc,2}^{mux}$$

may begin from the last symbol of the respective DCI 305, and may be unaffected by the timeline $$T_{proc,1}^{mux} + d$$

associated with the PDSCH 310. In addition, the UE 115 may utilize the multiplexing timeline 300 (as opposed to a timeline based on $$T_{proc,1}^{mux}$$

without d) when the PUSCH 320 includes an uplink transport block (e.g., an UL-SCH). For example, if the PUSCH 320 includes the first HARQ feedback portion, the second HARQ feedback portion, and CSI, but without an uplink transport block (e.g., an UL-SCH), the timeline $$T_{proc,1}^{mux}$$

may be sufficient.

Figure 4A:
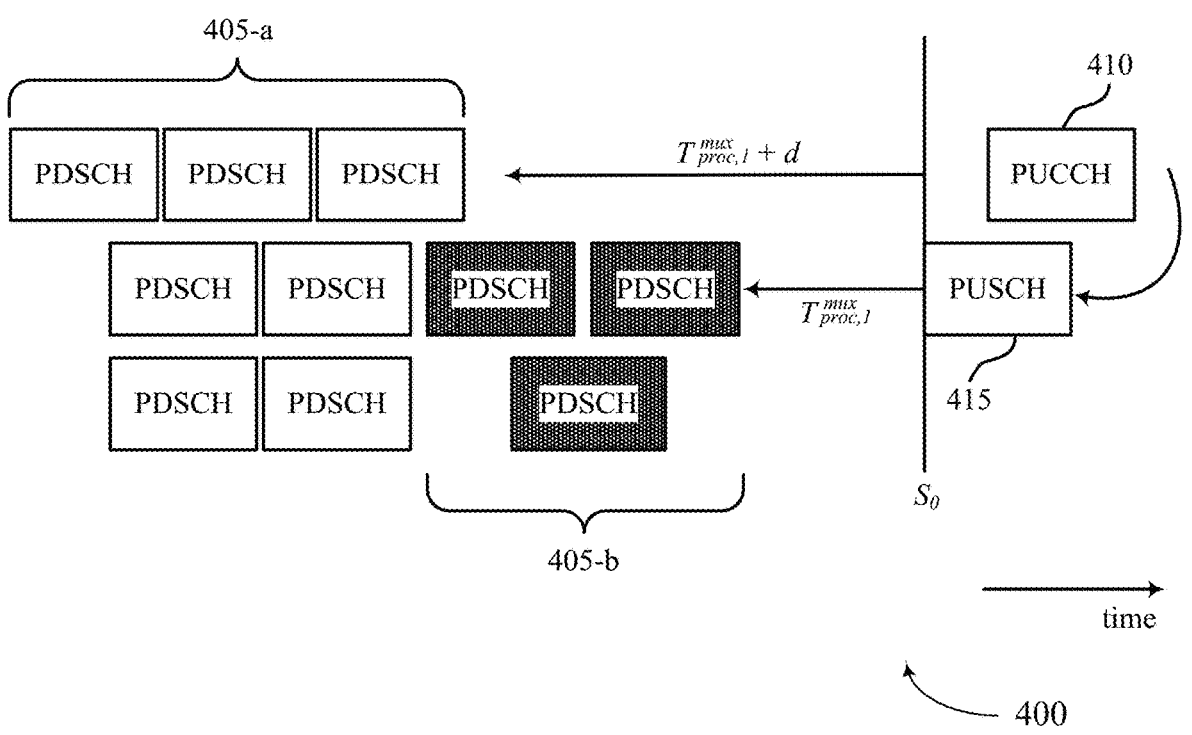

FIG. 4A shows an example of a multiplexing timeline 400 that supports multiplexing two-part HARQ feedback on an uplink shared channel in accordance with one or more aspects of the present disclosure. In some examples, the multiplexing timeline 400 may implement aspects of the wireless communications systems 100 and 200 and the multiplexing timeline 300, or may be implemented by aspects of the wireless communications systems 100 and 200 and the multiplexing timeline 300. For example, the multiplexing timeline 400 may represent an extended timeline for UCI multiplexing when a UE 115 multiplexes two-part HARQ feedback (including a first HARQ feedback portion and a second HARQ feedback portion) on a PUSCH 415.

Figure 4B:
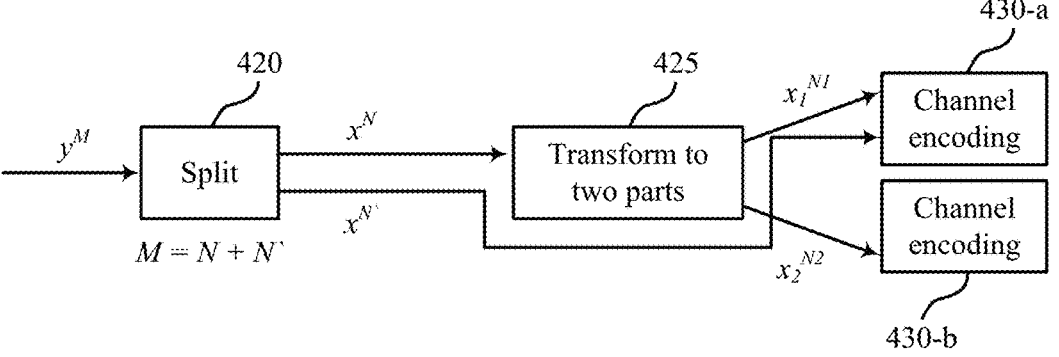
FIG. 4B shows an example of a PDSCH transformation that supports multiplexing two-part HARQ feedback on an uplink shared channel in accordance with one or more aspects of the present disclosure.

A UE 115 may receive respective DCI that schedules a PUCCH 410 and a PUSCH 415. In addition, the UE 115 may receive one or more PDSCHs 405. When utilizing the multiplexing timeline 400, the UE 115 may divide the one or more PDSCHs 405 into two sets: early PDSCHs 405-*a* and late PDSCHs 405-*b*. The division of the PDSCHs 405 may depend on whether a last symbol of a PDSCH satisfies an extended timeline (e.g., $$T_{proc,1}^{mux} + d$$

as described herein with reference to FIG. 3), and is described herein with reference to FIG. 4B.

In addition, the UE 115 may expect that a first symbol $S_0$ of the earliest of the PUCCH 410 and the PUSCH 415, among a group of overlapping PUCCHs and PUSCHs in a slot, is not before a symbol with a CP starting after a time $$T_{proc,1}^{mux} + d$$

that is after a last symbol of any corresponding PDSCH. That is, the early PDSCHs 405-*a* may precede transmission of the PUSCH 415 by a threshold time $$T_{proc,1}^{mux}, + d$$

that is associated with a two-part HARQ reporting scheme. The late PDSCHs 405-*b* may precede the transmission of the PUSCH 415 by a time that is less than the threshold time. The value of d may represent a timeline relaxation that allows the UE 115 to decode an early PDSCH 405-*a* and still have enough time to perform a PUSCH rate-matching procedure. In some examples, d may be indicated as a UE capability in terms of a quantity of symbols that is specific to the multiplexing timeline 400. Alternatively, d may have a value equal to $$T_{proc,2}^{mux},$$

which may be based on a timeline related to a PUSCH processing capability of the UE 115. The late PDSCHs 405-*b* may precede the transmission of the PUSCH 415 by a time $$T_{proc,1}^{mux}.$$

The UE 115 may determine the size (e.g., a quantity of bits) of the second HARQ feedback portion based on decoding the early PDSCHs 405-*a*. Therefore, the UE 115 may determine a quantity of REs for multiplexing the second HARQ feedback portion, and therefore the UE 115 may determine a quantity of REs for an uplink transport block. In this way, the UE 115 may transmit the second HARQ feedback portion of the two-part HARQ feedback with the PUSCH 415 in accordance with the rate-matching procedure based on an early PDSCH 405-*a* preceding the transmission of the PUSCH 415 by a time $$T_{proc,1}^{mux} + d.$$

The UE 115 may transmit additional HARQ feedback associated with the late PDSCHs 405-*b* in accordance with a single-part HARQ feedback reporting scheme. The UE 115 may utilize the multiplexing timeline 400 (as opposed to a timeline based on $$T_{proc,1}^{mux}$$

without d) when the PUSCH 415 includes an uplink transport block (e.g., an UL-SCH).

FIG. 4B shows an example of a PDSCH transformation 401 that supports multiplexing two-part HARQ feedback on an uplink shared channel in accordance with one or more aspects of the present disclosure. In some examples, the PDSCH transformation 401 may implement aspects of the wireless communications systems 100 and 200 and the multiplexing timeline 400, or may be implemented by aspects of the wireless communications systems 100 and 200 and the multiplexing timeline 400. For example, a UE 115 may use the PDSCH transformation 401 to divide one or more PDSCHs into two sets, including a set of early PDSCHs and a set of late PDSCHs.

The UE 115 may divide the PDSCHs in accordance with the PDSCH transformation 401, which may be based on whether a last symbol of a PDSCH satisfies the extended timeline $$T_{proc,1}^{mux} + d$$

as described herein with reference to FIG. 3. For example, at 420, the UE 115-*a* may split a quantity of original HARQ-ACK bits (e.g., a HARQ-ACK codebook), y, into the two sets, where M=N+N', and where N may represent a quantity of bits in a set of early PDSCHs and N' may represent a quantity of bits in a set of late PDSCHs. The result of the splitting may include N PDSCHs in the set of early PDSCHs, with $x^N$ corresponding to the HARQ-ACK feedback message for the PDSCHs in the set of early PDSCHs (e.g., 7 bits), and N'PDSCHs in the set of late PDSCHs, with x corresponding to the HARQ-ACK feedback message for the PDSCHs in the set of late PDSCHs (e.g., 3 bits).

At 425, the HARQ-ACK feedback message $x^N$ for the early PDSCHs may then be transformed into two parts, $$x_1^{N_1}$$

corresponding to a first HARQ feedback portion of the HARQ feedback message and $$x_2^{N_2}$$

corresponding to a second HARQ feedback portion of the HARQ feedback message. At 430-*a*, the UE 115 may perform channel encoding based on the $x^{N'}$ and the $$x_1^{N_1},$$

and at 430-*b*, the UE 115 may perform channel encoding based on the $$x_2^{N_2}.$$

That is, the HARQ-ACK bits of the original $y^M$ bits corresponding to the early PDSCHs 405-*a* may be transformed into the two-part HARQ feedback, but the HARQ-ACK bits of the original $y^M$ bits corresponding to the late PDSCHs 405-*b* may be directly used for the first HARQ feedback portion (without compression or transformation into two parts). In this way, the UE 115 may determine a quantity of REs for the second HARQ feedback portion ahead of time, based on decoding results of the early PDSCHs 405-*a*.

In some examples, a bit (e.g., a NACK) in the HARQ-ACK codebook may be due to missing DCI, which the UE 115 may determine based on a downlink assignment indicator (DAI) counter. The UE 115 may not reliably determine whether this bit is associated with the early PDSCHs 405-*a* or the late PDSCHs 405-*b*, which may complicate communications between the UE 115 and a network entity 105. To address this, the DAI counting may be separated between DAIs indicted in DCI scheduling early PDSCHs 405-*a* and DAIs indicated in DCI scheduling late PDSCHs 405-*b*. This may create two HARQ-ACK sub-codebooks. The UE 115 may then transform a first sub-codebook associated with the early PDSCHs 405-*a* into the two-part HARQ feedback and directly transmit a second sub-codebook associated with the late PDSCHs 405-*b* as part of single-part HARQ-ACK feedback. In addition, the PDSCH transformation 401 and the multiplexing timeline 400 (as opposed to a timeline based on $$T_{proc,1}^{max}$$

without d) when the PUSCH includes an uplink transport block (e.g., an UL-SCH). For example, if the PUSCH carriers a first HARQ feedback portion, a second HARQ feedback portion, and CSI, the UE 115 may transform the entire HARQ-ACK codebook into two portions without considering early PDSCHs 405-*a* and late PDSCHs 405-*b*.

Figure 5:
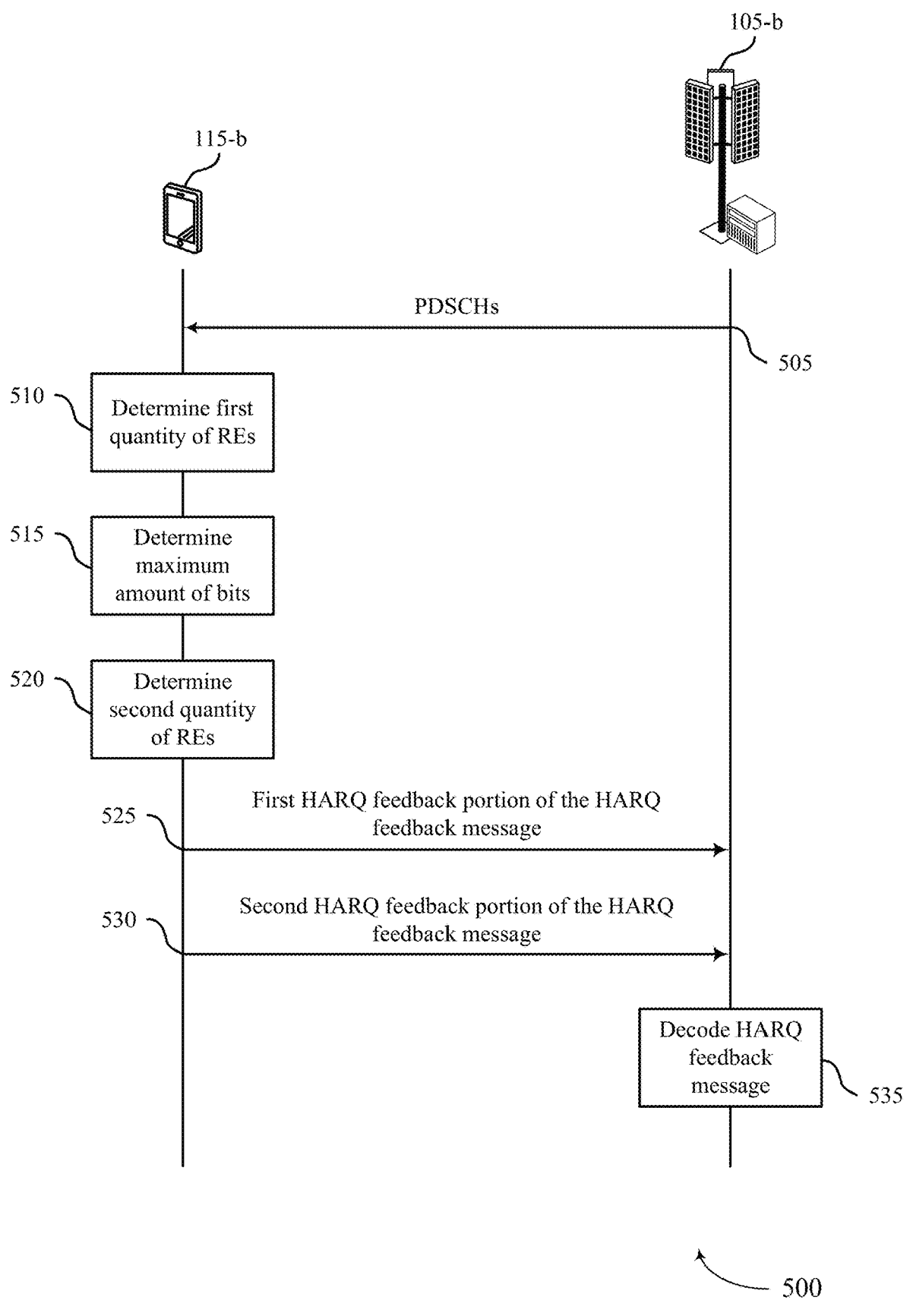
FIGS. 5 through 7 show examples of process flows that support multiplexing two-part HARQ feedback on an uplink shared channel in accordance with one or more aspects of the present disclosure.

FIG. 5 shows an example of a process flow 500 that supports multiplexing two-part HARQ feedback on an uplink shared channel in accordance with one or more aspects of the present disclosure. The process flow 500 may implement aspects of wireless communications systems 100 and 200, or may be implemented by aspects of the wireless communications system 100 and 200. For example, the process flow 500 may illustrate operations between a UE 115-*b* and a network entity 105-*b*, which may be examples of corresponding devices described herein. In the following description of the process flow 500, the operations between the UE 115-*b* and the network entity 105-*b* may be transmitted in a different order than the example order shown, or the operations performed by the UE 115-*b* and the network entity 105-*b* may be performed in different orders or at different times. Some operations may also be omitted from the process flow 500, and other operations may be added to the process flow 500.

At 505, the UE 115-*b* may receive, from the network entity 105-*b*, one or more PDSCH messages for which HARQ feedback is scheduled to be reported, where reporting of the HARQ feedback is scheduled to overlap with transmission of a PUSCH message. The HARQ feedback is configured to be reported in accordance with a two-part HARQ feedback reporting scheme for reporting a HARQ feedback message that includes a first HARQ feedback portion corresponding to a first quantity of bits that is fixed and a second HARQ feedback portion corresponding to a second quantity of bits that is variable.

At 510, the UE 115-*b* may determine a first quantity of REs based on the first quantity of bits. The first quantity of REs may thus correspond to the first HARQ feedback portion.

At 515, the UE 115-*b* may determine the maximum amount of the second quantity of bits independent of the content of the first HARQ feedback portion, where the second HARQ feedback portion reporting scheme defines that a second quantity of REs is based on the maximum amount of the second quantity of bits.

At 520, in accordance with a second HARQ feedback portion reporting scheme, the UE 115-*b* may determine the second quantity of REs is based on the maximum amount of the second quantity of bits. The second quantity of REs may thus correspond to the second HARQ feedback portion.

At 525, the UE 115-*b* may transmit, to the network entity 105-*b*, the first HARQ feedback portion of the HARQ feedback message with the PUSCH message on the first quantity of resource elements. At 530, the UE 115-*b* may transmit, to the network entity 105-*b*, the second HARQ feedback portion of the HARQ feedback message with the PUSCH message on the second quantity of resource elements. The UE 115-*b* may transmit the second HARQ feedback portion in accordance with at least a rate-matching procedure or a puncturing procedure.

At 535, the network entity 105-*b* may decode the HARQ feedback message in accordance with the second HARQ feedback portion reporting scheme. For example, the network entity 105-*b* may decode the first HARQ feedback portion first and then may decode the second HARQ feedback portion based on the first HARQ feedback portion.

Figure 6:
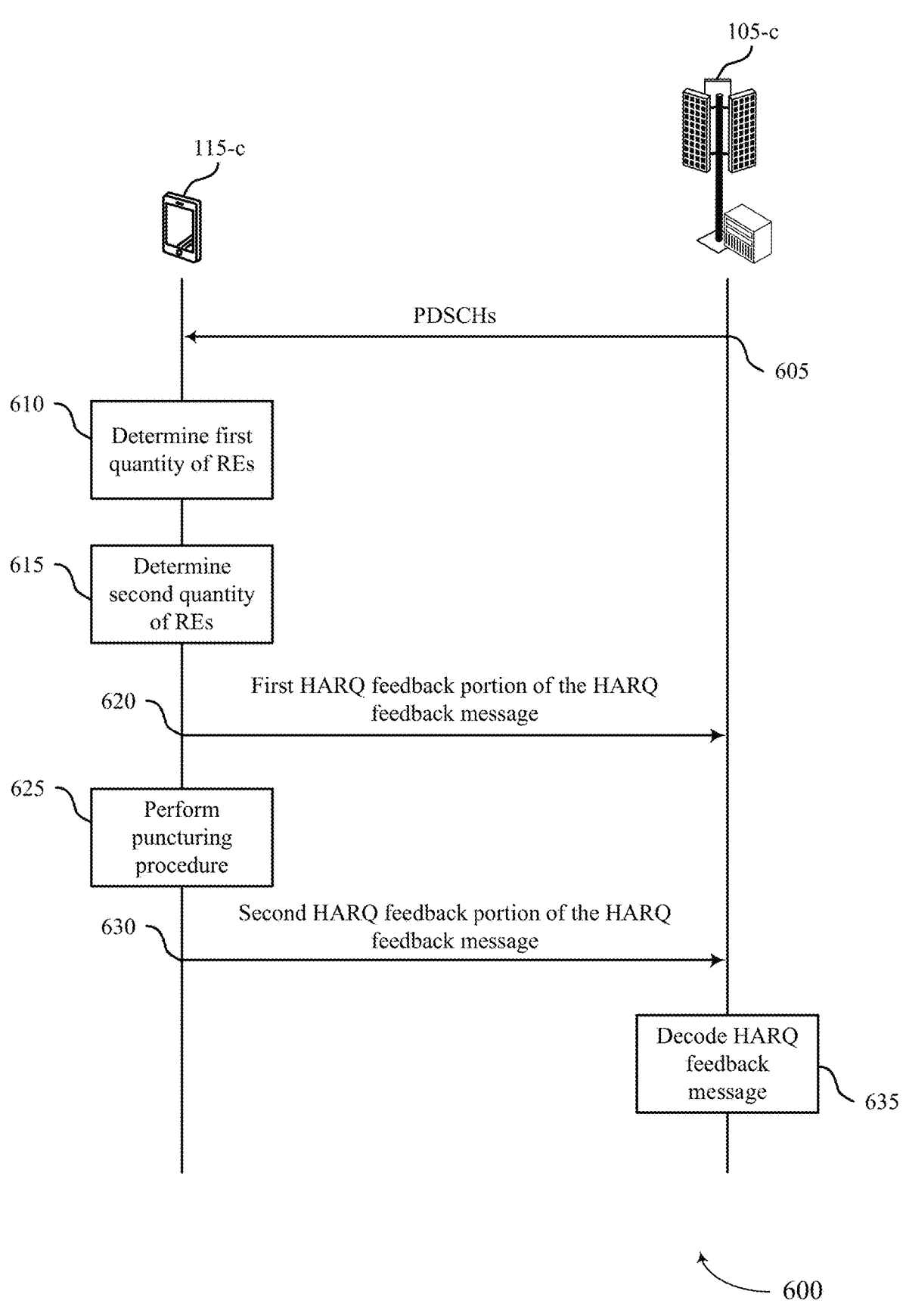

FIG. 6 shows an example of a process flow 600 that supports multiplexing two-part HARQ feedback on an uplink shared channel in accordance with one or more aspects of the present disclosure. For example, the process flow 600 may illustrate operations between a UE 115-*c* and a network entity 105-*c*, which may be examples of corresponding devices described herein. In the following description of the process flow 600, the operations between the UE 115-*c* and the network entity 105-*c* may be transmitted in a different order than the example order shown, or the operations performed by the UE 115-*c* and the network entity 105-*c* may be performed in different orders or at different times. Some operations may also be omitted from the process flow 600, and other operations may be added to the process flow 600.

At 605, the UE 115-*c* may receive, from the network entity 105-*c*, one or more PDSCH messages for which HARQ feedback is scheduled to be reported, where reporting of the HARQ feedback is scheduled to overlap with transmission of a PUSCH message. The HARQ feedback is configured to be reported in accordance with a two-part HARQ feedback reporting scheme for reporting a HARQ feedback message that includes a first HARQ feedback portion corresponding to a first quantity of bits that is fixed and a second HARQ feedback portion corresponding to a second quantity of bits that is variable based on a content of the first HARQ feedback portion.

At 610, the UE 115-*c* may determine a first quantity of REs based on the first quantity of bits. The first quantity of REs may thus correspond to the first HARQ feedback portion.

At 615, in accordance with a second HARQ feedback portion reporting scheme, the UE 115-*c* may determine a second quantity of REs based on the second quantity of bits or a maximum amount of the second quantity of bits. The second quantity of REs may thus correspond to the second HARQ feedback portion.

At 620, the UE 115-*c* may transmit, to the network entity 105-*c*, the first HARQ feedback portion of the HARQ feedback message with the PUSCH message on the first quantity of resource elements.

At 625, the UE 115-*c* may perform a puncturing procedure based on the second quantity of REs in accordance with the second HARQ feedback portion reporting scheme. In some examples, the UE 115-*c* may also perform a rate-matching procedure based on the first quantity of REs. The UE 115-*c* may puncture a set of REs or an uplink transport block with the second quantity of REs. If the UE 115-*c* determines that CSI is available for transmission with the PUSCH message, the UE 115-*c* may reserve REs not occupied by the CSI for the second HARQ feedback portion.

At 630, the UE 115-*c* may transmit, to the network entity 105-*c*, the second HARQ feedback portion of the HARQ feedback message with the PUSCH message on the second quantity of REs and in accordance with the rate-matching procedure and the puncturing procedure.

At 635, the network entity 105-*c* may decode the HARQ feedback message in accordance with the second HARQ feedback portion reporting scheme. For example, the network entity 105-*c* may decode the first HARQ feedback portion first and then may decode the second HARQ feedback portion based on the first HARQ feedback portion.

Figure 7:
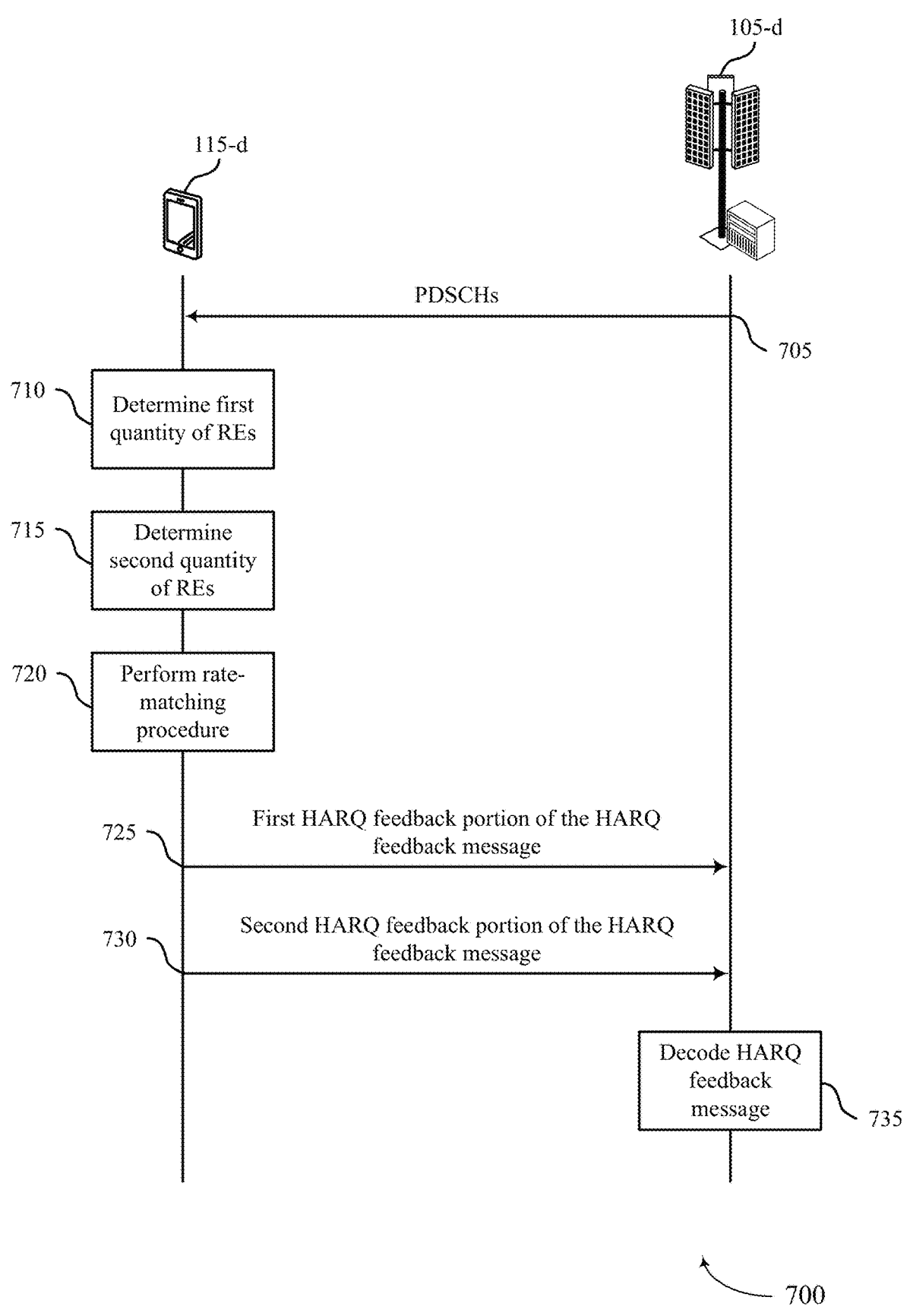

FIG. 7 shows an example of a process flow 700 that supports multiplexing two-part HARQ feedback on an uplink shared channel in accordance with one or more aspects of the present disclosure. The process flow 700 may implement aspects of wireless communications systems 100 and 200, or may be implemented by aspects of the wireless communications system 100 and 200. For example, the process flow 700 may illustrate operations between a UE 115-*d* and a network entity 105-*d*, which may be examples of corresponding devices described herein. In the following description of the process flow 700, the operations between the UE 115-*d* and the network entity 105-*d* may be transmitted in a different order than the example order shown, or the operations performed by the UE 115-*d* and the network entity 105-*d* may be performed in different orders or at different times. Some operations may also be omitted from the process flow 700, and other operations may be added to the process flow 700.

At 705, the UE 115-*d* may receive, from the network entity 105-*d*, one or more PDSCH messages for which HARQ feedback is scheduled to be reported, where reporting of the HARQ feedback is scheduled to overlap with transmission of a PUSCH message. The HARQ feedback is configured to be reported in accordance with a two-part HARQ feedback reporting scheme for reporting a HARQ feedback message that includes a first HARQ feedback portion corresponding to a first quantity of bits that is fixed and a second HARQ feedback portion corresponding to a second quantity of bits that is variable based on a content of the first HARQ feedback portion.

At 710, the UE 115-*d* may determine a first quantity of REs based on the first quantity of bits. The first quantity of REs may thus correspond to the first HARQ feedback portion.

At 715, in accordance with a second HARQ feedback portion reporting scheme, the UE 115-*d* may determine a second quantity of REs based on the second quantity of bits or a maximum amount of the second quantity of bits. The second quantity of REs may thus correspond to the second HARQ feedback portion.

At 720, the UE 115-*d* may perform a rate-matching procedure based on the first quantity of REs and the second quantity of REs in accordance with the second HARQ feedback portion reporting scheme. The UE 115-*d* may perform the rate-matching procedure after decoding one or more PDSCHs and before a first symbol of the PUSCH message is to be transmitted.

At 725, the UE 115-*d* may transmit, to the network entity 105-*d*, the first HARQ feedback portion of the HARQ feedback message with the PUSCH message on the first quantity of resource elements.

At 730, the UE 115-*d* may transmit, to the network entity 105-*d*, the second HARQ feedback portion of the HARQ feedback message with the PUSCH message on the second quantity of REs and in accordance with the rate-matching procedure based on a last of the one or more PDSCH messages preceding the transmission of the PUSCH message by a threshold time (e.g.,)

$$T_{proc,1}^{mux} + d$$

that is associated with the two-part HARQ feedback reporting scheme.

At 735, the network entity 105-*d* may decode the HARQ feedback message in accordance with the second HARQ feedback portion reporting scheme. For example, the network entity 105-*d* may decode the first HARQ feedback portion first and then may decode the second HARQ feedback portion based on the first HARQ feedback portion.

Figure 8:
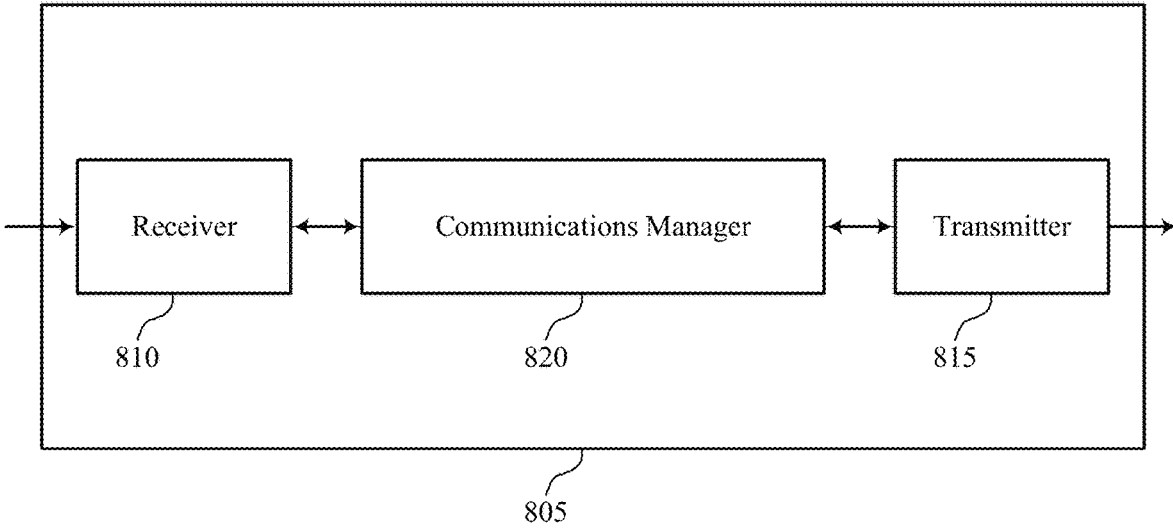
FIGS. 8 and 9 show block diagrams of devices that support multiplexing two-part HARQ feedback on an uplink shared channel in accordance with one or more aspects of the present disclosure.

FIG. 8 shows a block diagram 800 of a device 805 that supports multiplexing two-part HARQ feedback on an uplink shared channel in accordance with one or more aspects of the present disclosure. The device 805 may be an example of aspects of a UE 115 as described herein. The device 805 may include a receiver 810, a transmitter 815, and a communications manager 820. The device 805, or one or more components of the device 805 (e.g., the receiver 810, the transmitter 815, and the communications manager 820), may include at least one processor, which may be coupled with at least one memory, to, individually or collectively, support or enable the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to multiplexing two-part HARQ feedback on an uplink shared channel). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to multiplexing two-part HARQ feedback on an uplink shared channel). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of multiplexing two-part HARQ feedback on an uplink shared channel as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code (e.g., as communications management software or firmware) executed by at least one processor. If implemented in code executed by at least one processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. For example, the communications manager 820 is capable of, configured to, or operable to support a means for receiving one or more PDSCH messages for which HARQ feedback is scheduled to be reported, where reporting of the HARQ feedback is scheduled to overlap with transmission of an PUSCH message, and where the HARQ feedback is configured to be reported, at least in part, in accordance with a two-part HARQ feedback reporting scheme for reporting a HARQ feedback message that includes a first HARQ feedback portion corresponding to a first quantity of bits that is fixed and a second HARQ feedback portion corresponding to a second quantity of bits that is variable based on a content of the first HARQ feedback portion. The communications manager 820 is capable of, configured to, or operable to support a means for determining a first quantity of REs based on the first quantity of bits. The communications manager 820 is capable of, configured to, or operable to support a means for determining, in accordance with a second HARQ feedback portion reporting scheme, a second quantity of REs based on the second quantity of bits or to a maximum amount of the second quantity of bits. The communications manager 820 is capable of, configured to, or operable to support a means for transmitting the first HARQ feedback portion of the HARQ feedback message with the PUSCH message on the first quantity of REs and the second HARQ feedback portion of the HARQ feedback message with the PUSCH message on the second quantity of REs, the second HARQ feedback portion transmitted in accordance with at least a rate-matching procedure or a puncturing procedure.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for multiplexing two-part HARQ feedback on a PUSCH, which may support improved throughput, reduced latency, and improved decoding results.

Figure 9:
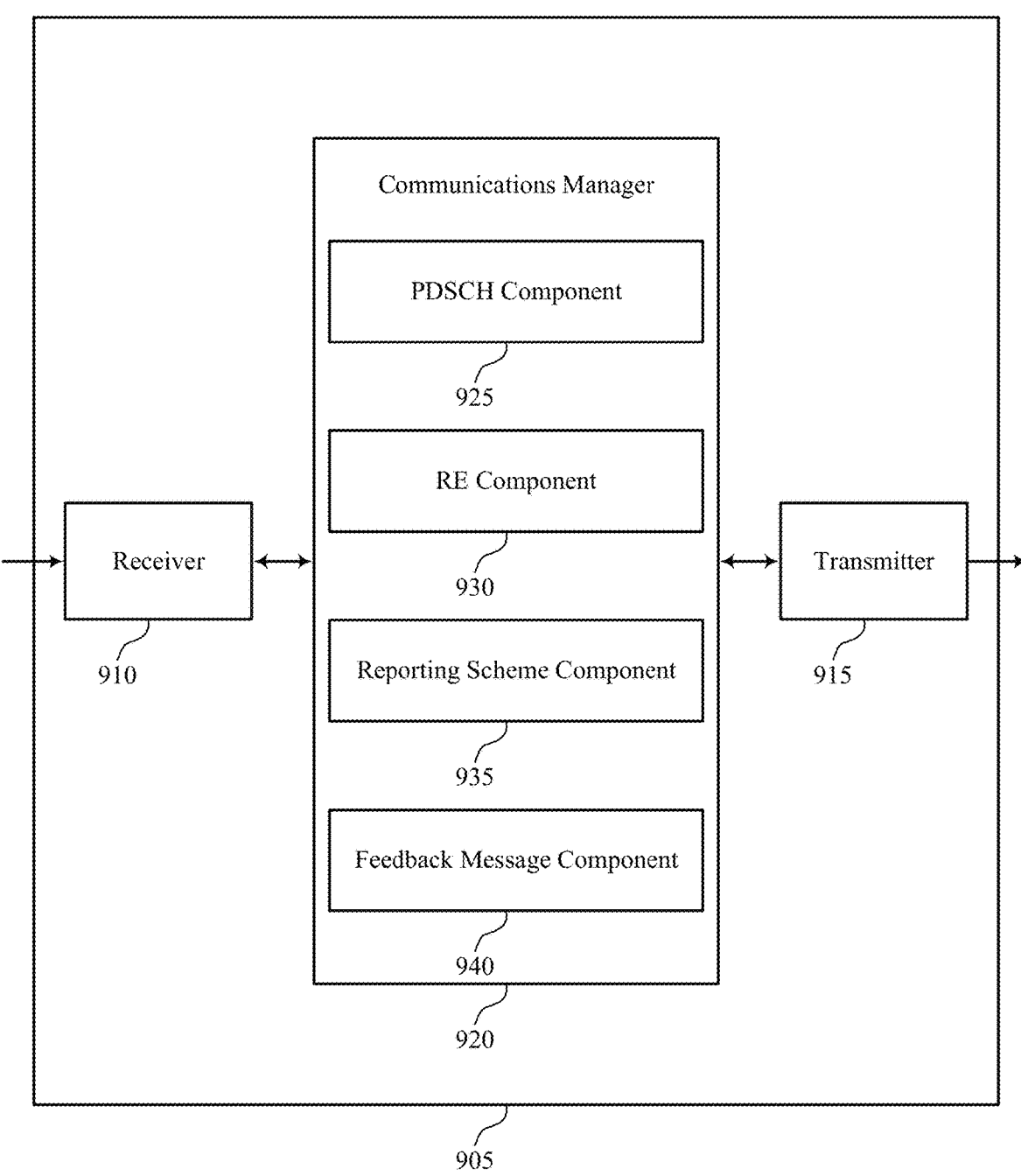

FIG. 9 shows a block diagram 900 of a device 905 that supports multiplexing two-part HARQ feedback on an uplink shared channel in accordance with one or more aspects of the present disclosure. The device 905 may be an example of aspects of a device 805 or a UE 115 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to support the described techniques. Each of these components may be in communication with one another (e.g., via one or more buses).

The receiver 910 may provide a means for receiving information such as packets, user data, control information, or any combination thereof associated with various information channels (e.g., control channels, data channels, information channels related to multiplexing two-part HARQ feedback on an uplink shared channel). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to multiplexing two-part HARQ feedback on an uplink shared channel). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of multiplexing two-part HARQ feedback on an uplink shared channel as described herein. For example, the communications manager 920 may include an PDSCH component 925, a RE component 930, a reporting scheme component 935, a feedback message component 940, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. The PDSCH component 925 is capable of, configured to, or operable to support a means for receiving one or more PDSCH messages for which HARQ feedback is scheduled to be reported, where reporting of the HARQ feedback is scheduled to overlap with transmission of an PUSCH message, and where the HARQ feedback is configured to be reported, at least in part, in accordance with a two-part HARQ feedback reporting scheme for reporting a HARQ feedback message that includes a first HARQ feedback portion corresponding to a first quantity of bits that is fixed and a second HARQ feedback portion corresponding to a second quantity of bits that is variable based on a content of the first HARQ feedback portion. The RE component 930 is capable of, configured to, or operable to support a means for determining a first quantity of REs based on the first quantity of bits. The reporting scheme component 935 is capable of, configured to, or operable to support a means for determining, in accordance with a second HARQ feedback portion reporting scheme, a second quantity of REs based on the second quantity of bits or to a maximum amount of the second quantity of bits. The feedback message component 940 is capable of, configured to, or operable to support a means for transmitting the first HARQ feedback portion of the HARQ feedback message with the PUSCH message on the first quantity of REs and the second HARQ feedback portion of the HARQ feedback message with the PUSCH message on the second quantity of REs, the second HARQ feedback portion transmitted in accordance with at least a rate-matching procedure or a puncturing procedure.

Figure 10:
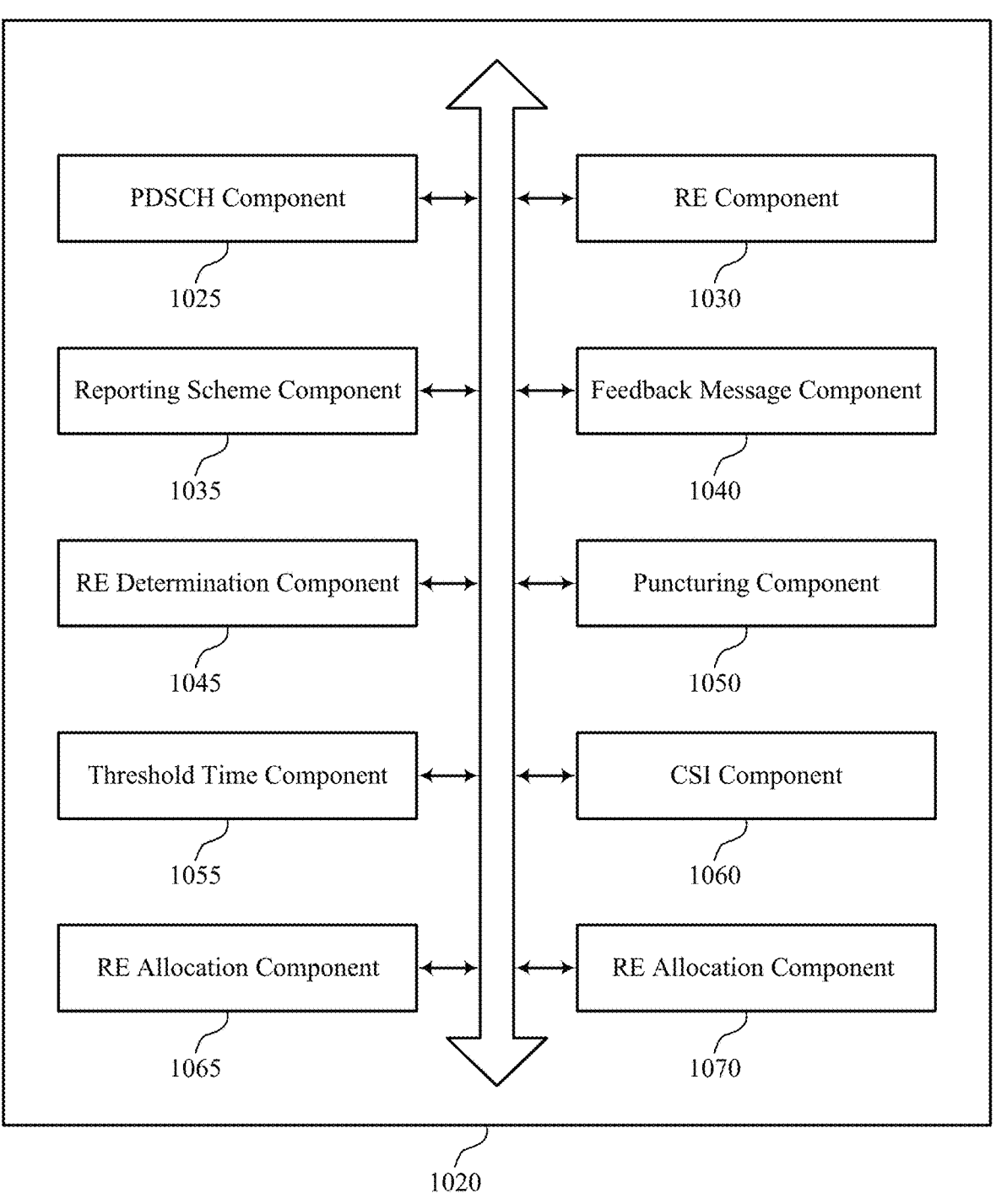
FIG. 10 shows a block diagram of a communications manager that supports multiplexing two-part HARQ feedback on an uplink shared channel in accordance with one or more aspects of the present disclosure.

FIG. 10 shows a block diagram 1000 of a communications manager 1020 that supports multiplexing two-part HARQ feedback on an uplink shared channel in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of multiplexing two-part HARQ feedback on an uplink shared channel as described herein. For example, the communications manager 1020 may include an PDSCH component 1025, a RE component 1030, a reporting scheme component 1035, a feedback message component 1040, a RE determination component 1045, a puncturing component 1050, a threshold time component 1055, a CSI component 1060, a RE allocation component 1065, a RE allocation component 1070, or any combination thereof. Each of these components, or components or subcomponents thereof (e.g., one or more processors, one or more memories), may communicate, directly or indirectly, with one another (e.g., via one or more buses).

The communications manager 1020 may support wireless communications in accordance with examples as disclosed herein. The PDSCH component 1025 is capable of, configured to, or operable to support a means for receiving one or more PDSCH messages for which HARQ feedback is scheduled to be reported, where reporting of the HARQ feedback is scheduled to overlap with transmission of an PUSCH message, and where the HARQ feedback is configured to be reported, at least in part, in accordance with a two-part HARQ feedback reporting scheme for reporting a HARQ feedback message that includes a first HARQ feedback portion corresponding to a first quantity of bits that is fixed and a second HARQ feedback portion corresponding to a second quantity of bits that is variable based on a content of the first HARQ feedback portion. The RE component 1030 is capable of, configured to, or operable to support a means for determining a first quantity of REs based on the first quantity of bits. The reporting scheme component 1035 is capable of, configured to, or operable to support a means for determining, in accordance with a second HARQ feedback portion reporting scheme, a second quantity of REs based on the second quantity of bits or to a maximum amount of the second quantity of bits. The feedback message component 1040 is capable of, configured to, or operable to support a means for transmitting the first HARQ feedback portion of the HARQ feedback message with the PUSCH message on the first quantity of REs and the second HARQ feedback portion of the HARQ feedback message with the PUSCH message on the second quantity of REs, the second HARQ feedback portion transmitted in accordance with at least a rate-matching procedure or a puncturing procedure.

In some examples, to support determining the second quantity of REs, the RE determination component 1045 is capable of, configured to, or operable to support a means for determining the maximum amount of the second quantity of bits independent of the content of the first HARQ feedback portion, where the second HARQ feedback portion reporting scheme defines that the second quantity of REs is based on the maximum amount of the second quantity of bits.

In some examples, the second quantity of REs is based on a quantity of cyclic redundancy check bits corresponding to the maximum amount of the second quantity of bits. In some examples, application of the second HARQ feedback portion reporting scheme is based on the PUSCH message including an uplink transport block.

In some examples, application of the second HARQ feedback portion reporting scheme is based on a last of the one or more PDSCH messages being received less than a threshold duration of time prior to transmission of the PUSCH message. In some examples, the second quantity of REs is populated with a sequence of values that is based on the second quantity of bits being zero.

In some examples, to support transmitting the first HARQ feedback portion and the second HARQ feedback portion of the HARQ feedback message with the PUSCH message, the feedback message component 1040 is capable of, configured to, or operable to support a means for refraining to include the second quantity of REs in the HARQ feedback message based on the second quantity of bits being zero.

In some examples, to support transmitting the first HARQ feedback portion and the second HARQ feedback portion of the HARQ feedback message with the PUSCH message, the puncturing component 1050 is capable of, configured to, or operable to support a means for transmitting the second HARQ feedback portion of the HARQ feedback message with the PUSCH message in accordance with the rate-matching procedure and the puncturing procedure, where the puncturing procedure is based on the second quantity of REs in accordance with the second HARQ feedback portion reporting scheme. In some examples, the rate-matching procedure is based on the first quantity of REs.

In some examples, the CSI component 1060 is capable of, configured to, or operable to support a means for determining that CSI is available for transmission with the PUSCH message. In some examples, the RE allocation component 1065 is capable of, configured to, or operable to support a means for determining a maximum amount of the second quantity of REs based on the maximum amount of the second quantity of bits, where the maximum amount of the second quantity of bits is independent of the content of the first HARQ feedback portion. In some examples, the RE allocation component 1070 is capable of, configured to, or operable to support a means for reserving the maximum amount of the second quantity of REs for the puncturing procedure. In some examples, the RE allocation component 1065 is capable of, configured to, or operable to support a means for allocating, for transmission with the PUSCH message, a third quantity of REs corresponding to the CSI, where the third quantity of REs are exclusive of the reserved maximum amount of the second quantity of REs.

In some examples, to support transmitting the first HARQ feedback portion and the second HARQ feedback portion of the HARQ feedback message with the PUSCH message, the RE allocation component 1065 is capable of, configured to, or operable to support a means for allocating a subset of the maximum amount of the second quantity of REs for the second HARQ feedback portion based on the second quantity of bits, where the subset is the second quantity of REs and is less than or equal to the maximum amount of the second quantity of REs. In some examples, to support transmitting the first HARQ feedback portion and the second HARQ feedback portion of the HARQ feedback message with the PUSCH message, the RE allocation component 1065 is capable of, configured to, or operable to support a means for transmitting the third quantity of REs with the PUSCH message in accordance with the rate-matching procedure, where the puncturing procedure is based on the subset of the maximum amount of the second quantity of REs.

In some examples, to support transmitting the first HARQ feedback portion and the second HARQ feedback portion of the HARQ feedback message with the PUSCH message, the threshold time component 1055 is capable of, configured to, or operable to support a means for transmitting the second HARQ feedback portion of the HARQ feedback message with the PUSCH message in accordance with a rate-matching procedure based on a last of the one or more PDSCH messages preceding the transmission of the PUSCH message by a threshold time that is associated with the two-part HARQ feedback reporting scheme, where the rate-matching procedure is based on the first quantity of REs and the second quantity of REs in accordance with the second HARQ feedback portion reporting scheme.

In some examples, the threshold time is based on a quantity of symbols associated with a capability of the UE. In some examples, application of the second HARQ feedback portion reporting scheme is based on the PUSCH message including an uplink transport block.

In some examples, the one or more PDSCH messages are a first set of PDSCH messages, and the threshold time component 1055 is capable of, configured to, or operable to support a means for receiving a second set of PDSCH messages for which additional HARQ feedback is scheduled to overlap with the transmission of the PUSCH message, where the second set of PDSCH messages are received before the transmission of the PUSCH message by less than the threshold time that is associated with the two-part HARQ feedback reporting scheme. In some examples, the one or more PDSCH messages are a first set of PDSCH messages, and the feedback message component 1040 is capable of, configured to, or operable to support a means for transmitting the additional HARQ feedback with the first quantity of REs in accordance with a single-part HARQ feedback reporting scheme.

In some examples, the HARQ feedback associated with the first set of PDSCH messages is associated with a first downlink assignment indicator (DAI) counting process and a first HARQ sub-codebook, and the additional HARQ feedback associated with the second set of PDSCH messages is associated with a second DAI counting process and a second HARQ sub-codebook. In some examples, application of the second HARQ feedback portion reporting scheme is based on the PUSCH message including an uplink transport block.

Figure 11:
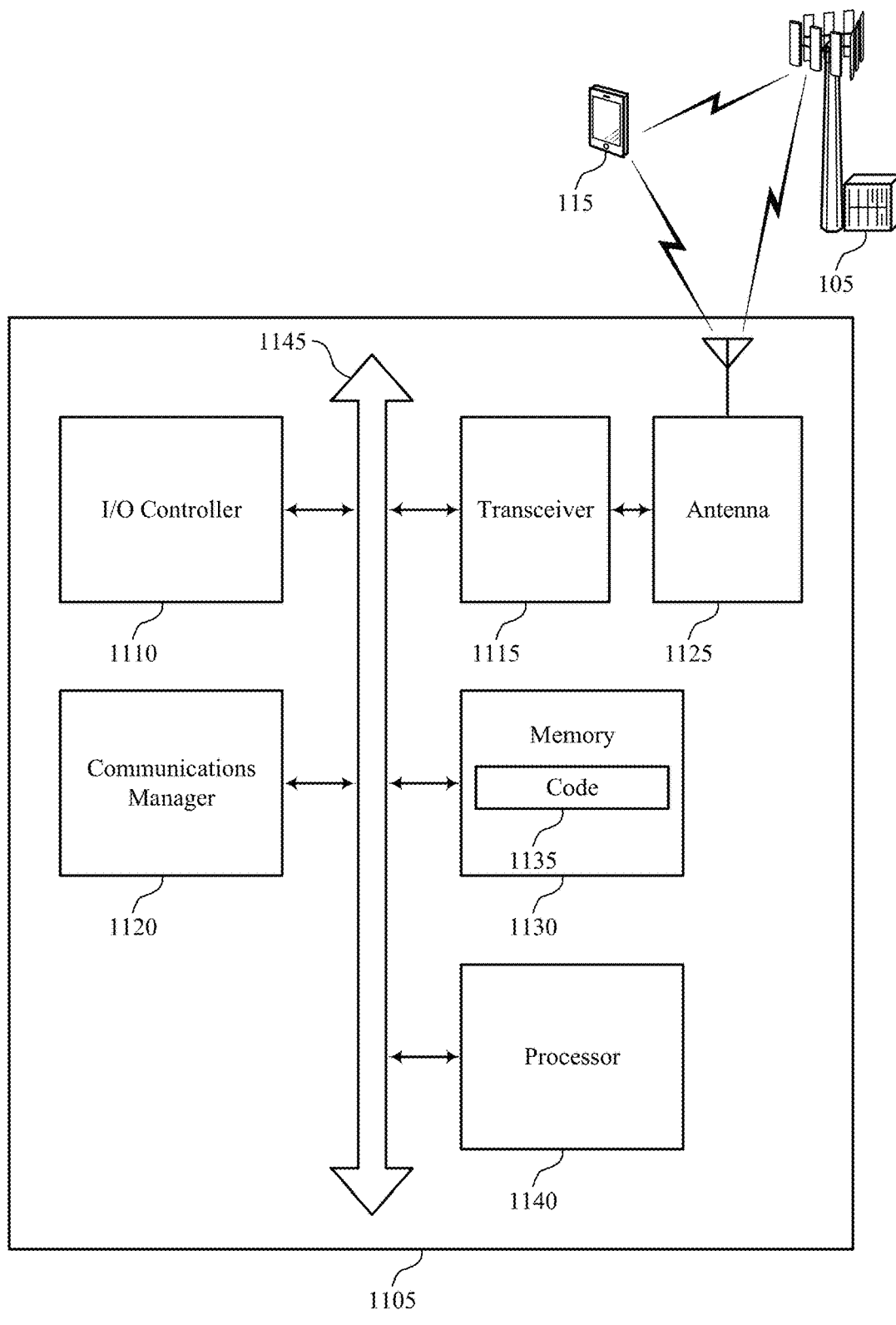
FIG. 11 shows a diagram of a system including a device that supports multiplexing two-part HARQ feedback on an uplink shared channel in accordance with one or more aspects of the present disclosure.

FIG. 11 shows a diagram of a system 1100 including a device 1105 that supports multiplexing two-part HARQ feedback on an uplink shared channel in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, at least one memory 1130, code 1135, and at least one processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of one or more processors, such as the at least one processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The at least one memory 1130 may include random access memory (RAM) and read-only memory (ROM). The at least one memory 1130 may store computer-readable, computer-executable code 1135 including instructions that, when executed by the at least one processor 1140, cause the device 1105 to perform various functions described herein. The code 1135 may be stored in a non-transitory computer-readable medium such as system memory or another type of memory. In some cases, the code 1135 may not be directly executable by the at least one processor 1140 but may cause a computer (e.g., when compiled and executed) to perform functions described herein. In some cases, the at least one memory 1130 may contain, among other things, a basic I/O system (BIOS) which may control basic hardware or software operation such as the interaction with peripheral components or devices.

The at least one processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1140 may be configured to operate a memory array using a memory controller. In some other cases, a memory controller may be integrated into the at least one processor 1140. The at least one processor 1140 may be configured to execute computer-readable instructions stored in a memory (e.g., the at least one memory 1130) to cause the device 1105 to perform various functions (e.g., functions or tasks supporting multiplexing two-part HARQ feedback on an uplink shared channel). For example, the device 1105 or a component of the device 1105 may include at least one processor 1140 and at least one memory 1130 coupled with or to the at least one processor 1140, the at least one processor 1140 and at least one memory 1130 configured to perform various functions described herein. In some examples, the at least one processor 1140 may include multiple processors and the at least one memory 1130 may include multiple memories. One or more of the multiple processors may be coupled with one or more of the multiple memories, which may, individually or collectively, be configured to perform various functions herein. In some examples, the at least one processor 1140 may be a component of a processing system, which may refer to a system (such as a series) of machines, circuitry (including, for example, one or both of processor circuitry (which may include the at least one processor 1140) and memory circuitry (which may include the at least one memory 1130)), or components, that receives or obtains inputs and processes the inputs to produce, generate, or obtain a set of outputs. The processing system may be configured to perform one or more of the functions described herein. As such, the at least one processor 1140 or a processing system including the at least one processor 1140 may be configured to, configurable to, or operable to cause the device 1105 to perform one or more of the functions described herein. Further, as described herein, being "configured to," being "configurable to," and being "operable to" may be used interchangeably and may be associated with a capability, when executing code stored in the at least one memory 1130 or otherwise, to perform one or more of the functions described herein.

The communications manager 1120 may support wireless communications in accordance with examples as disclosed herein. For example, the communications manager 1120 is capable of, configured to, or operable to support a means for receiving one or more PDSCH messages for which HARQ feedback is scheduled to be reported, where reporting of the HARQ feedback is scheduled to overlap with transmission of an PUSCH message, and where the HARQ feedback is configured to be reported, at least in part, in accordance with a two-part HARQ feedback reporting scheme for reporting a HARQ feedback message that includes a first HARQ feedback portion corresponding to a first quantity of bits that is fixed and a second HARQ feedback portion corresponding to a second quantity of bits that is variable based on a content of the first HARQ feedback portion. The communications manager 1120 is capable of, configured to, or operable to support a means for determining a first quantity of REs based on the first quantity of bits. The communications manager 1120 is capable of, configured to, or operable to support a means for determining, in accordance with a second HARQ feedback portion reporting scheme, a second quantity of REs based on the second quantity of bits or to a maximum amount of the second quantity of bits. The communications manager 1120 is capable of, configured to, or operable to support a means for transmitting the first HARQ feedback portion of the HARQ feedback message with the PUSCH message on the first quantity of REs and the second HARQ feedback portion of the HARQ feedback message with the PUSCH message on the second quantity of REs, the second HARQ feedback portion transmitted in accordance with at least a rate-matching procedure or a puncturing procedure.

By including or configuring the communications manager 1120 in accordance with examples as described herein, the device 1105 may support techniques for multiplexing two-part HARQ feedback on a PUSCH, which may support improved throughput, reduced latency, and improved decoding results.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the at least one processor 1140, the at least one memory 1130, the code 1135, or any combination thereof. For example, the code 1135 may include instructions executable by the at least one processor 1140 to cause the device 1105 to perform various aspects of multiplexing two-part HARQ feedback on an uplink shared channel as described herein, or the at least one processor 1140 and the at least one memory 1130 may be otherwise configured to, individually or collectively, perform or support such operations.

Figure 12:
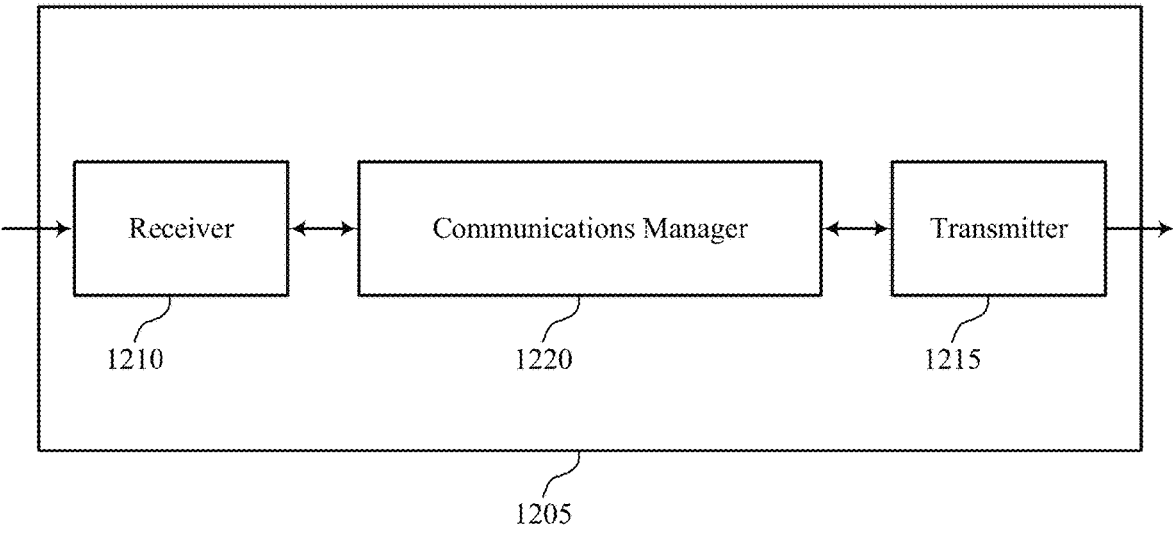
FIGS. 12 and 13 show block diagrams of devices that support multiplexing two-part HARQ feedback on an uplink shared channel in accordance with one or more aspects of the present disclosure.

FIG. 12 shows a block diagram 1200 of a device 1205 that supports multiplexing two-part HARQ feedback on an uplink shared channel in accordance with one or more aspects of the present disclosure. The device 1205 may be an example of aspects of a network entity 105 as described herein. The device 1205 may include a receiver 1210, a transmitter 1215, and a communications manager 1220. The device 1205, or one or more components of the device 1205 (e.g., the receiver 1210, the transmitter 1215, and the communications manager 1220), may include at least one processor, which may be coupled with at least one memory, to, individually or collectively, support or enable the described techniques. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The communications manager 1220, the receiver 1210, the transmitter 1215, or various combinations thereof or various components thereof may be examples of means for performing various aspects of multiplexing two-part HARQ feedback on an uplink shared channel as described herein. For example, the communications manager 1220, the receiver 1210, the transmitter 1215, or various combinations or components thereof may be capable of performing one or more of the functions described herein.

In some examples, the communications manager 1220, the receiver 1210, the transmitter 1215, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1220, the receiver 1210, the transmitter 1215, or various combinations or components thereof may be implemented in code (e.g., as communications management software or firmware) executed by at least one processor. If implemented in code executed by at least one processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications in accordance with examples as disclosed herein. For example, the communications manager 1220 is capable of, configured to, or operable to support a means for transmitting one or more PDSCH messages for which HARQ feedback is scheduled to be reported, where reporting of the HARQ feedback is scheduled to overlap with transmission of an PUSCH message, and where the HARQ feedback is configured to be reported, at least in part, in accordance with a two-part HARQ feedback reporting scheme for reporting a HARQ feedback message that includes a first HARQ feedback portion corresponding to a first quantity of bits that is fixed and a second HARQ feedback portion corresponding to a second quantity of bits that is variable based on a content of the first HARQ feedback portion. The communications manager 1220 is capable of, configured to, or operable to support a means for receiving the first HARQ feedback portion of the HARQ feedback message with the PUSCH message on the first quantity of REs and the second HARQ feedback portion of the HARQ feedback message with the PUSCH message on the second quantity of REs, the second HARQ feedback portion transmitted in accordance with at least a rate-matching procedure or a puncturing procedure, where a first quantity of REs is based on the first quantity of bits, and where a second quantity of REs is based on the second quantity of bits or a maximum amount of the second quantity of bits in accordance with a second HARQ feedback portion reporting scheme. The communications manager 1220 is capable of, configured to, or operable to support a means for decoding the HARQ feedback message in accordance with the second HARQ feedback portion reporting scheme.

By including or configuring the communications manager 1220 in accordance with examples as described herein, the device 1205 (e.g., at least one processor controlling or otherwise coupled with the receiver 1210, the transmitter 1215, the communications manager 1220, or a combination thereof) may support techniques for multiplexing two-part HARQ feedback on a PUSCH, which may support improved throughput, reduced latency, and improved decoding results.

Figure 13:
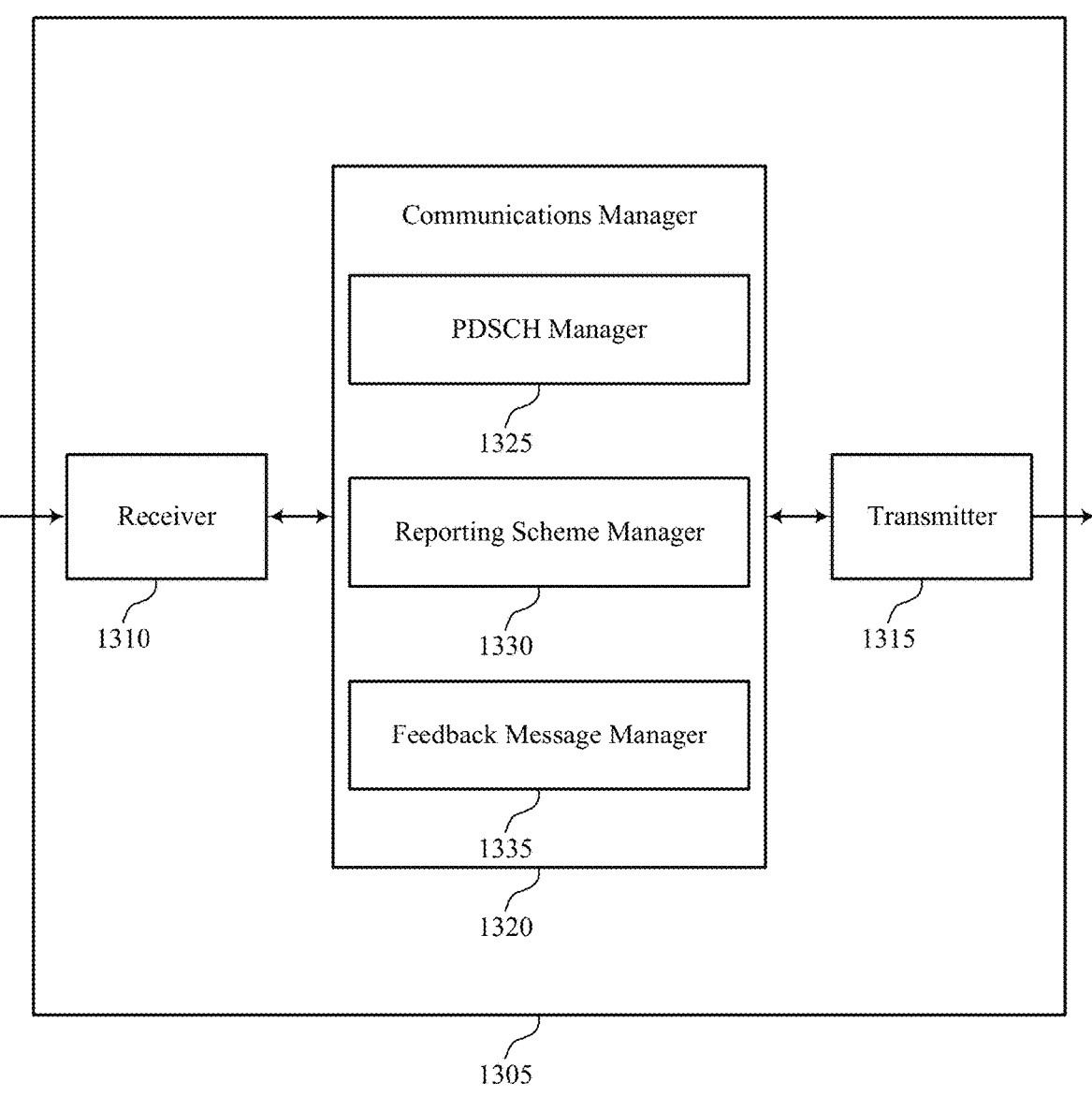

FIG. 13 shows a block diagram 1300 of a device 1305 that supports multiplexing two-part HARQ feedback on an uplink shared channel in accordance with one or more aspects of the present disclosure. The device 1305 may be an example of aspects of a device 1205 or a network entity 105 as described herein. The device 1305 may include a receiver 1310, a transmitter 1315, and a communications manager 1320. The device 1305, or one or more components of the device 1305 (e.g., the receiver 1310, the transmitter 1315, and the communications manager 1320), may include at least one processor, which may be coupled with at least one memory, to support the described techniques. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The device 1305, or various components thereof, may be an example of means for performing various aspects of multiplexing two-part HARQ feedback on an uplink shared channel as described herein. For example, the communications manager 1320 may include an PDSCH manager 1325, a reporting scheme manager 1330, a feedback message manager 1335, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communications in accordance with examples as disclosed herein. The PDSCH manager 1325 is capable of, configured to, or operable to support a means for transmitting one or more PDSCH messages for which HARQ feedback is scheduled to be reported, where reporting of the HARQ feedback is scheduled to overlap with transmission of an PUSCH message, and where the HARQ feedback is configured to be reported, at least in part, in accordance with a two-part HARQ feedback reporting scheme for reporting a HARQ feedback message that includes a first HARQ feedback portion corresponding to a first quantity of bits that is fixed and a second HARQ feedback portion corresponding to a second quantity of bits that is variable based on a content of the first HARQ feedback portion. The reporting scheme manager 1330 is capable of, configured to, or operable to support a means for receiving the first HARQ feedback portion of the HARQ feedback message with the PUSCH message on the first quantity of REs and the second HARQ feedback portion of the HARQ feedback message with the PUSCH message on the second quantity of REs, the second HARQ feedback portion transmitted in accordance with at least a rate-matching procedure or a puncturing procedure, where a first quantity of REs is based on the first quantity of bits, and where a second quantity of REs is based on the second quantity of bits or a maximum amount of the second quantity of bits in accordance with a second HARQ feedback portion reporting scheme. The feedback message manager 1335 is capable of, configured to, or operable to support a means for decoding the HARQ feedback message in accordance with the second HARQ feedback portion reporting scheme.

Figure 14:
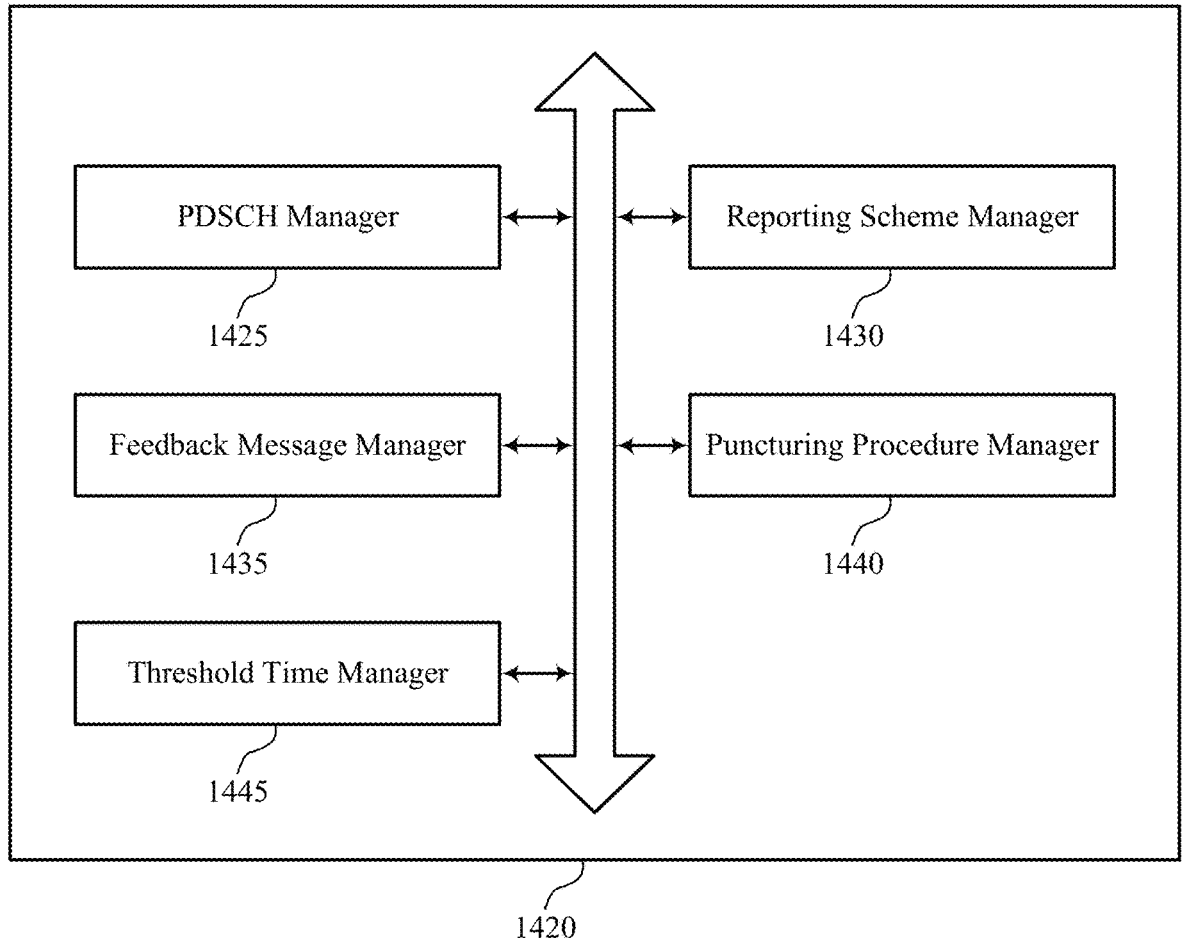
FIG. 14 shows a block diagram of a communications manager that supports multiplexing two-part HARQ feedback on an uplink shared channel in accordance with one or more aspects of the present disclosure.

FIG. 14 shows a block diagram 1400 of a communications manager 1420 that supports multiplexing two-part HARQ feedback on an uplink shared channel in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of multiplexing two-part HARQ feedback on an uplink shared channel as described herein. For example, the communications manager 1420 may include an PDSCH manager 1425, a reporting scheme manager 1430, a feedback message manager 1435, a puncturing procedure manager 1440, a threshold time manager 1445, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1420 may support wireless communications in accordance with examples as disclosed herein. The PDSCH manager 1425 is capable of, configured to, or operable to support a means for transmitting one or more PDSCH messages for which HARQ feedback is scheduled to be reported, where reporting of the HARQ feedback is scheduled to overlap with transmission of an PUSCH message, and where the HARQ feedback is configured to be reported, at least in part, in accordance with a two-part HARQ feedback reporting scheme for reporting a HARQ feedback message that includes a first HARQ feedback portion corresponding to a first quantity of bits that is fixed and a second HARQ feedback portion corresponding to a second quantity of bits that is variable based on a content of the first HARQ feedback portion. The reporting scheme manager 1430 is capable of, configured to, or operable to support a means for receiving the first HARQ feedback portion of the HARQ feedback message with the PUSCH message on the first quantity of REs and the second HARQ feedback portion of the HARQ feedback message with the PUSCH message on the second quantity of REs, the second HARQ feedback portion transmitted in accordance with at least a rate-matching procedure or a puncturing procedure, where a first quantity of REs is based on the first quantity of bits, and where a second quantity of REs is based on the second quantity of bits or a maximum amount of the second quantity of bits in accordance with a second HARQ feedback portion reporting scheme. The feedback message manager 1435 is capable of, configured to, or operable to support a means for decoding the HARQ feedback message in accordance with the second HARQ feedback portion reporting scheme.

In some examples, a maximum amount of the second quantity of bits is independent of the content of the first HARQ feedback portion. In some examples, the second HARQ feedback portion reporting scheme defines that the second quantity of REs is based on the maximum amount of the second quantity of bits.

In some examples, the second quantity of REs is based on a quantity of cyclic redundancy check bits corresponding to the maximum amount of the second quantity of bits. In some examples, the second quantity of REs is populated with a sequence of values that is based on the second quantity of bits being zero.

In some examples, to support receiving the first HARQ feedback portion and the second HARQ feedback portion of the HARQ feedback message with the PUSCH message, the puncturing procedure manager 1440 is capable of, configured to, or operable to support a means for receiving the second HARQ feedback portion of the HARQ feedback message with the PUSCH message in accordance with the rate-matching procedure and a puncturing procedure, where the puncturing procedure is based on the second quantity of REs in accordance with the second HARQ feedback portion reporting scheme. In some examples, the rate-matching procedure is based on the first quantity of REs.

In some examples, to support receiving the first HARQ feedback portion and the second HARQ feedback portion of the HARQ feedback message with the PUSCH message, the threshold time manager 1445 is capable of, configured to, or operable to support a means for receiving the second HARQ feedback portion of the HARQ feedback message with the PUSCH message in accordance with a rate-matching procedure based on a last of the one or more PDSCH messages preceding transmission, to the network entity, of the PUSCH message by a threshold time that is associated with the two-part HARQ feedback reporting scheme, where the rate-matching procedure is based on the first quantity of REs and the second quantity of REs in accordance with the second HARQ feedback portion reporting scheme. In some examples, the threshold time is based on a quantity of symbols associated with a capability of a UE.

In some examples, the one or more PDSCH messages are a first set of PDSCH messages, and the threshold time manager 1445 is capable of, configured to, or operable to support a means for transmitting a second set of PDSCH messages for which additional HARQ feedback is scheduled to overlap with the transmission of the PUSCH message, where the second set of PDSCH messages are transmitted before the transmission of the PUSCH message by less than the threshold time that is associated with the two-part HARQ feedback reporting scheme. In some examples, the one or more PDSCH messages are a first set of PDSCH messages, and the threshold time manager 1445 is capable of, configured to, or operable to support a means for receiving the additional HARQ feedback with the first quantity of REs in accordance with a single-part HARQ feedback reporting scheme.

In some examples, the HARQ feedback associated with the first set of PDSCH messages is associated with a first downlink assignment indicator (DAI) counting process and a first HARQ sub-codebook, and the additional HARQ feedback associated with the second set of PDSCH messages is associated with a second DAI counting process and a second HARQ sub-codebook.

Figure 15:
FIG. 15 shows a diagram of a system including a device that supports multiplexing two-part HARQ feedback on an uplink shared channel in accordance with one or more aspects of the present disclosure.

FIG. 15 shows a diagram of a system 1500 including a device 1505 that supports multiplexing two-part HARQ feedback on an uplink shared channel in accordance with one or more aspects of the present disclosure. The device 1505 may be an example of or include the components of a device 1205, a device 1305, or a network entity 105 as described herein. The device 1505 may communicate with one or more network entities 105, one or more UEs 115, or any combination thereof, which may include communications over one or more wired interfaces, over one or more wireless interfaces, or any combination thereof. The device 1505 may include components that support outputting and obtaining communications, such as a communications manager 1520, a transceiver 1510, an antenna 1515, at least one memory 1525, code 1530, and at least one processor 1535. These components may be in electronic communication or otherwise coupled (e.g., operatively, communicatively, functionally, electronically, electrically) via one or more buses (e.g., a bus 1540).

The transceiver 1510 may support bi-directional communications via wired links, wireless links, or both as described herein. In some examples, the transceiver 1510 may include a wired transceiver and may communicate bi-directionally with another wired transceiver. Additionally, or alternatively, in some examples, the transceiver 1510 may include a wireless transceiver and may communicate bi-directionally with another wireless transceiver. In some examples, the device 1505 may include one or more antennas 1515, which may be capable of transmitting or receiving wireless transmissions (e.g., concurrently). The transceiver 1510 may also include a modem to modulate signals, to provide the modulated signals for transmission (e.g., by one or more antennas 1515, by a wired transmitter), to receive modulated signals (e.g., from one or more antennas 1515, from a wired receiver), and to demodulate signals. In some implementations, the transceiver 1510 may include one or more interfaces, such as one or more interfaces coupled with the one or more antennas 1515 that are configured to support various receiving or obtaining operations, or one or more interfaces coupled with the one or more antennas 1515 that are configured to support various transmitting or outputting operations, or a combination thereof. In some implementations, the transceiver 1510 may include or be configured for coupling with one or more processors or one or more memory components that are operable to perform or support operations based on received or obtained information or signals, or to generate information or other signals for transmission or other outputting, or any combination thereof. In some implementations, the transceiver 1510, or the transceiver 1510 and the one or more antennas 1515, or the transceiver 1510 and the one or more antennas 1515 and one or more processors or one or more memory components (e.g., the at least one processor 1535, the at least one memory 1525, or both), may be included in a chip or chip assembly that is installed in the device 1505. In some examples, the transceiver 1510 may be operable to support communications via one or more communications links (e.g., a communication link 125, a backhaul communication link 120, a midhaul communication link 162, a fronthaul communication link 168).

The at least one memory 1525 may include RAM, ROM, or any combination thereof. The at least one memory 1525 may store computer-readable, computer-executable code 1530 including instructions that, when executed by one or more of the at least one processor 1535, cause the device 1505 to perform various functions described herein. The code 1530 may be stored in a non-transitory computer-readable medium such as system memory or another type of memory. In some cases, the code 1530 may not be directly executable by a processor of the at least one processor 1535 but may cause a computer (e.g., when compiled and executed) to perform functions described herein. In some cases, the at least one memory 1525 may contain, among other things, a BIOS which may control basic hardware or software operation such as the interaction with peripheral components or devices. In some examples, the at least one processor 1535 may include multiple processors and the at least one memory 1525 may include multiple memories. One or more of the multiple processors may be coupled with one or more of the multiple memories which may, individually or collectively, be configured to perform various functions herein (for example, as part of a processing system).

The at least one processor 1535 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1535 may be configured to operate a memory array using a memory controller. In some other cases, a memory controller may be integrated into one or more of the at least one processor 1535. The at least one processor 1535 may be configured to execute computer-readable instructions stored in a memory (e.g., one or more of the at least one memory 1525) to cause the device 1505 to perform various functions (e.g., functions or tasks supporting multiplexing two-part HARQ feedback on an uplink shared channel). For example, the device 1505 or a component of the device 1505 may include at least one processor 1535 and at least one memory 1525 coupled with one or more of the at least one processor 1535, the at least one processor 1535 and the at least one memory 1525 configured to perform various functions described herein. The at least one processor 1535 may be an example of a cloud-computing platform (e.g., one or more physical nodes and supporting software such as operating systems, virtual machines, or container instances) that may host the functions (e.g., by executing code 1530) to perform the functions of the device 1505. The at least one processor 1535 may be any one or more suitable processors capable of executing scripts or instructions of one or more software programs stored in the device 1505 (such as within one or more of the at least one memory 1525). In some examples, the at least one processor 1535 may include multiple processors and the at least one memory 1525 may include multiple memories. One or more of the multiple processors may be coupled with one or more of the multiple memories, which may, individually or collectively, be configured to perform various functions herein. In some examples, the at least one processor 1535 may be a component of a processing system, which may refer to a system (such as a series) of machines, circuitry (including, for example, one or both of processor circuitry (which may include the at least one processor 1535) and memory circuitry (which may include the at least one memory 1525)), or components, that receives or obtains inputs and processes the inputs to produce, generate, or obtain a set of outputs. The processing system may be configured to perform one or more of the functions described herein. As such, the at least one processor 1535 or a processing system including the at least one processor 1535 may be configured to, configurable to, or operable to cause the device 1505 to perform one or more of the functions described herein. Further, as described herein, being "configured to," being "configurable to," and being "operable to" may be used interchangeably and may be associated with a capability, when executing code stored in the at least one memory 1525 or otherwise, to perform one or more of the functions described herein.

In some examples, a bus 1540 may support communications of (e.g., within) a protocol layer of a protocol stack. In some examples, a bus 1540 may support communications associated with a logical channel of a protocol stack (e.g., between protocol layers of a protocol stack), which may include communications performed within a component of the device 1505, or between different components of the device 1505 that may be co-located or located in different locations (e.g., where the device 1505 may refer to a system in which one or more of the communications manager 1520, the transceiver 1510, the at least one memory 1525, the code 1530, and the at least one processor 1535 may be located in one of the different components or divided between different components).

In some examples, the communications manager 1520 may manage aspects of communications with a core network 130 (e.g., via one or more wired or wireless backhaul links). For example, the communications manager 1520 may manage the transfer of data communications for client devices, such as one or more UEs 115. In some examples, the communications manager 1520 may manage communications with other network entities 105, and may include a controller or scheduler for controlling communications with UEs 115 in cooperation with other network entities 105. In some examples, the communications manager 1520 may support an X2 interface within an LTE/LTE-A wireless communications network technology to provide communication between network entities 105.

The communications manager 1520 may support wireless communications in accordance with examples as disclosed herein. For example, the communications manager 1520 is capable of, configured to, or operable to support a means for transmitting one or more PDSCH messages for which HARQ feedback is scheduled to be reported, where reporting of the HARQ feedback is scheduled to overlap with transmission of an PUSCH message, and where the HARQ feedback is configured to be reported, at least in part, in accordance with a two-part HARQ feedback reporting scheme for reporting a HARQ feedback message that includes a first HARQ feedback portion corresponding to a first quantity of bits that is fixed and a second HARQ feedback portion corresponding to a second quantity of bits that is variable based on a content of the first HARQ feedback portion. The communications manager 1520 is capable of, configured to, or operable to support a means for receiving the first HARQ feedback portion of the HARQ feedback message with the PUSCH message on the first quantity of REs and the second HARQ feedback portion of the HARQ feedback message with the PUSCH message on the second quantity of REs, the second HARQ feedback portion transmitted in accordance with at least a rate-matching procedure or a puncturing procedure, where a first quantity of REs is based on the first quantity of bits, and where a second quantity of REs is based on the second quantity of bits or a maximum amount of the second quantity of bits in accordance with a second HARQ feedback portion reporting scheme. The communications manager 1520 is capable of, configured to, or operable to support a means for decoding the HARQ feedback message in accordance with the second HARQ feedback portion reporting scheme.

By including or configuring the communications manager 1520 in accordance with examples as described herein, the device 1505 may support techniques for multiplexing two-part HARQ feedback on a PUSCH, which may support improved throughput, reduced latency, and improved decoding results.

In some examples, the communications manager 1520 may be configured to perform various operations (e.g., receiving, obtaining, monitoring, outputting, transmitting) using or otherwise in cooperation with the transceiver 1510, the one or more antennas 1515 (e.g., where applicable), or any combination thereof. Although the communications manager 1520 is illustrated as a separate component, in some examples, one or more functions described with reference to the communications manager 1520 may be supported by or performed by the transceiver 1510, one or more of the at least one processor 1535, one or more of the at least one memory 1525, the code 1530, or any combination thereof (for example, by a processing system including at least a portion of the at least one processor 1535, the at least one memory 1525, the code 1530, or any combination thereof). For example, the code 1530 may include instructions executable by one or more of the at least one processor 1535 to cause the device 1505 to perform various aspects of multiplexing two-part HARQ feedback on an uplink shared channel as described herein, or the at least one processor 1535 and the at least one memory 1525 may be otherwise configured to, individually or collectively, perform or support such operations.

FIG. 16 shows a flowchart illustrating a method 1600 that supports multiplexing two-part HARQ feedback on an uplink shared channel in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving one or more PDSCH messages for which HARQ feedback is scheduled to be reported, where reporting of the HARQ feedback is scheduled to overlap with transmission of an PUSCH message, and where the HARQ feedback is configured to be reported, at least in part, in accordance with a two-part HARQ feedback reporting scheme for reporting a HARQ feedback message that includes a first HARQ feedback portion corresponding to a first quantity of bits that is fixed and a second HARQ feedback portion corresponding to a second quantity of bits that is variable based on a content of the first HARQ feedback portion. The operations of 1605 may be performed in accordance with examples as disclosed herein. In some examples, aspects of the operations of 1605 may be performed by an PDSCH component 1025 as described with reference to FIG. 10.

At 1610, the method may include determining a first quantity of REs based on the first quantity of bits. The operations of 1610 may be performed in accordance with examples as disclosed herein. In some examples, aspects of the operations of 1610 may be performed by a RE component 1030 as described with reference to FIG. 10.

At 1615, the method may include determining, in accordance with a second HARQ feedback portion reporting scheme, a second quantity of REs based on the second quantity of bits or to a maximum amount of the second quantity of bits. The operations of 1615 may be performed in accordance with examples as disclosed herein. In some examples, aspects of the operations of 1615 may be performed by a reporting scheme component 1035 as described with reference to FIG. 10.

At 1620, the method may include transmitting the first HARQ feedback portion of the HARQ feedback message with the PUSCH message on the first quantity of REs and the second HARQ feedback portion of the HARQ feedback message with the PUSCH message on the second quantity of REs, the second HARQ feedback portion transmitted in accordance with at least a rate-matching procedure or a puncturing procedure. The operations of 1620 may be performed in accordance with examples as disclosed herein. In some examples, aspects of the operations of 1620 may be performed by a feedback message component 1040 as described with reference to FIG. 10.

FIG. 17 shows a flowchart illustrating a method 1700 that supports multiplexing two-part HARQ feedback on an uplink shared channel in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1705, the method may include receiving one or more PDSCH messages for which HARQ feedback is scheduled to be reported, where reporting of the HARQ feedback is scheduled to overlap with transmission of an PUSCH message, and where the HARQ feedback is configured to be reported, at least in part, in accordance with a two-part HARQ feedback reporting scheme for reporting a HARQ feedback message that includes a first HARQ feedback portion corresponding to a first quantity of bits that is fixed and a second HARQ feedback portion corresponding to a second quantity of bits that is variable based on a content of the first HARQ feedback portion. The operations of 1705 may be performed in accordance with examples as disclosed herein. In some examples, aspects of the operations of 1705 may be performed by an PDSCH component 1025 as described with reference to FIG. 10.

At 1710, the method may include determining a first quantity of REs based on the first quantity of bits. The operations of 1710 may be performed in accordance with examples as disclosed herein. In some examples, aspects of the operations of 1710 may be performed by a RE component 1030 as described with reference to FIG. 10.

At 1715, the method may include determining a maximum amount of the second quantity of bits independent of the content of the first HARQ feedback portion, where a second HARQ feedback portion reporting scheme defines that a second quantity of REs is based on the maximum amount of the second quantity of bits. The operations of 1715 may be performed in accordance with examples as disclosed herein. In some examples, aspects of the operations of 1715 may be performed by a RE determination component 1045 as described with reference to FIG. 10.

At 1720, the method may include determining, in accordance with the second HARQ feedback portion reporting scheme, the second quantity of REs based on the second quantity of bits or to a maximum amount of the second quantity of bits. The operations of 1720 may be performed in accordance with examples as disclosed herein. In some examples, aspects of the operations of 1720 may be performed by a reporting scheme component 1035 as described with reference to FIG. 10.

At 1725, the method may include transmitting the first HARQ feedback portion of the HARQ feedback message with the PUSCH message on the first quantity of REs and the second HARQ feedback portion of the HARQ feedback message with the PUSCH message on the second quantity of REs, the second HARQ feedback portion transmitted in accordance with at least a rate-matching procedure or a puncturing procedure. The operations of 1725 may be performed in accordance with examples as disclosed herein. In some examples, aspects of the operations of 1725 may be performed by a feedback message component 1040 as described with reference to FIG. 10.

FIG. 18 shows a flowchart illustrating a method 1800 that supports multiplexing two-part HARQ feedback on an uplink shared channel in accordance with aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1805, the method may include receiving one or more PDSCH messages for which HARQ feedback is scheduled to be reported, where reporting of the HARQ feedback is scheduled to overlap with transmission of an PUSCH message, and where the HARQ feedback is configured to be reported, at least in part, in accordance with a two-part HARQ feedback reporting scheme for reporting a HARQ feedback message that includes a first HARQ feedback portion corresponding to a first quantity of bits that is fixed and a second HARQ feedback portion corresponding to a second quantity of bits that is variable based on a content of the first HARQ feedback portion. The operations of 1805 may be performed in accordance with examples as disclosed herein. In some examples, aspects of the operations of 1805 may be performed by an PDSCH component 1025 as described with reference to FIG. 10.

At 1810, the method may include determining a first quantity of REs based on the first quantity of bits. The operations of 1810 may be performed in accordance with examples as disclosed herein. In some examples, aspects of the operations of 1810 may be performed by a RE component 1030 as described with reference to FIG. 10.

At 1815, the method may include determining, in accordance with a second HARQ feedback portion reporting scheme, a second quantity of REs based on the second quantity of bits or to a maximum amount of the second quantity of bits. The operations of 1815 may be performed in accordance with examples as disclosed herein. In some examples, aspects of the operations of 1815 may be performed by a reporting scheme component 1035 as described with reference to FIG. 10.

At 1820, the method may include transmitting the first HARQ feedback portion of the HARQ feedback message with the PUSCH message on the first quantity of REs and the second HARQ feedback portion of the HARQ feedback message with the PUSCH message in accordance with the rate-matching procedure and the puncturing procedure, where the puncturing procedure is based on the second quantity of REs in accordance with the second HARQ feedback portion reporting scheme. The operations of 1820 may be performed in accordance with examples as disclosed herein. In some examples, aspects of the operations of 1820 may be performed by a puncturing component 1050 as described with reference to FIG. 10.

FIG. 19 shows a flowchart illustrating a method 1900 that supports multiplexing two-part HARQ feedback on an uplink shared channel in accordance with aspects of the present disclosure. The operations of the method 1900 may be implemented by a network entity or its components as described herein. For example, the operations of the method 1900 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 1905, the method may include receiving one or more PDSCH messages for which HARQ feedback is scheduled to be reported, where reporting of the HARQ feedback is scheduled to overlap with transmission of an PUSCH message, and where the HARQ feedback is configured to be reported, at least in part, in accordance with a two-part HARQ feedback reporting scheme for reporting a HARQ feedback message that includes a first HARQ feedback portion corresponding to a first quantity of bits that is fixed and a second HARQ feedback portion corresponding to a second quantity of bits that is variable based on a content of the first HARQ feedback portion. The operations of 1905 may be performed in accordance with examples as disclosed herein. In some examples, aspects of the operations of 1905 may be performed by an PDSCH manager 1425 as described with reference to FIG. 14.

At 1910, the method may include determining a first quantity of REs based on the first quantity of bits. The operations of 1910 may be performed in accordance with examples as disclosed herein. In some examples, aspects of the operations of 1910 may be performed by a RE component 1030 as described with reference to FIG. 10.

At 1915, the method may include determining, in accordance with a second HARQ feedback portion reporting scheme, a second quantity of REs based on the second quantity of bits or to a maximum amount of the second quantity of bits. The operations of 1915 may be performed in accordance with examples as disclosed herein. In some examples, aspects of the operations of 1915 may be performed by a reporting scheme component 1035 as described with reference to FIG. 10.

At 1920, the method may include transmitting the first HARQ feedback portion of the HARQ feedback message with the PUSCH message on the first quantity of REs and the second HARQ feedback portion of the HARQ feedback message with the PUSCH message in accordance with a rate-matching procedure based on a last of the one or more PDSCH messages preceding the transmission of the PUSCH message by a threshold time that is associated with the two-part HARQ feedback reporting scheme, where the rate-matching procedure is based on the first quantity of REs and the second quantity of REs in accordance with the second HARQ feedback portion reporting scheme. The operations of 1920 may be performed in accordance with examples as disclosed herein. In some examples, aspects of the operations of 1920 may be performed by a puncturing component 1050 as described with reference to FIG. 10.

FIG. 20 shows a flowchart illustrating a method 2000 that supports multiplexing two-part HARQ feedback on an uplink shared channel in accordance with aspects of the present disclosure. The operations of the method 2000 may be implemented by a network entity or its components as described herein. For example, the operations of the method 2000 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 2005, the method may include transmitting one or more PDSCH messages for which HARQ feedback is scheduled to be reported, where reporting of the HARQ feedback is scheduled to overlap with transmission of an PUSCH message, and where the HARQ feedback is configured to be reported, at least in part, in accordance with a two-part HARQ feedback reporting scheme for reporting a HARQ feedback message that includes a first HARQ feedback portion corresponding to a first quantity of bits that is fixed and a second HARQ feedback portion corresponding to a second quantity of bits that is variable based on a content of the first HARQ feedback portion. The operations of 2005 may be performed in accordance with examples as disclosed herein. In some examples, aspects of the operations of 2005 may be performed by an PDSCH manager 1425 as described with reference to FIG. 14.

At 2010, the method may include receiving the first HARQ feedback portion of the HARQ feedback message with the PUSCH message on the first quantity of REs and the second HARQ feedback portion of the HARQ feedback message with the PUSCH message on the second quantity of REs, the second HARQ feedback portion transmitted in accordance with at least a rate-matching procedure or a puncturing procedure, where a first quantity of REs is based on the first quantity of bits, and where a second quantity of REs is based on the second quantity of bits or a maximum amount of the second quantity of bits in accordance with a second HARQ feedback portion reporting scheme. The operations of 2010 may be performed in accordance with examples as disclosed herein. In some examples, aspects of the operations of 2010 may be performed by a reporting scheme manager 1430 as described with reference to FIG. 14.

At 2015, the method may include decoding the HARQ feedback message in accordance with the second HARQ feedback portion reporting scheme. The operations of 2015 may be performed in accordance with examples as disclosed herein. In some examples, aspects of the operations of 2015 may be performed by a feedback message manager 1435 as described with reference to FIG. 14.

The following provides an overview of aspects of the present disclosure:

Aspect 1: A method for wireless communications at a UE, comprising: receiving one or more PDSCH messages for which HARQ feedback is scheduled to be reported, wherein reporting of the HARQ feedback is scheduled to overlap with transmission of an PUSCH message, and wherein the HARQ feedback is configured to be reported, at least in part, in accordance with a two-part HARQ feedback reporting scheme for reporting a HARQ feedback message that includes a first HARQ feedback portion corresponding to a first quantity of bits that is fixed and a second HARQ feedback portion corresponding to a second quantity of bits that is variable based at least in part on a content of the first HARQ feedback portion; determining a first quantity of REs based at least in part on the first quantity of bits; determining, in accordance with a second HARQ feedback portion reporting scheme, a second quantity of REs based at least in part on the second quantity of bits or to a maximum amount of the second quantity of bits; and transmitting the first HARQ feedback portion of the HARQ feedback message with the PUSCH message on the first quantity of REs and the second HARQ feedback portion of the HARQ feedback message with the PUSCH message on the second quantity of REs, the second HARQ feedback portion transmitted in accordance with at least a rate-matching procedure or a puncturing procedure.

Aspect 2: The method of aspect 1, wherein determining the second quantity of REs further comprises: determining the maximum amount of the second quantity of bits independent of the content of the first HARQ feedback portion, wherein the second HARQ feedback portion reporting scheme defines that the second quantity of REs is based at least in part on the maximum amount of the second quantity of bits.

Aspect 3: The method of aspect 2, wherein the second quantity of REs is based at least in part on a quantity of CRC bits corresponding to the maximum amount of the second quantity of bits.

Aspect 4: The method of any of aspects 2 through 3, wherein application of the second HARQ feedback portion reporting scheme is based at least in part on the PUSCH message including an uplink transport block.

Aspect 5: The method of any of aspects 2 through 4, wherein application of the second HARQ feedback portion reporting scheme is based at least in part on a last of the one or more PDSCH messages being received less than a threshold duration of time prior to transmission of the PUSCH message.

Aspect 6: The method of any of aspects 2 through 5, wherein the second quantity of REs is populated with a sequence of values that is based at least in part on the second quantity of bits being zero.

Aspect 7: The method of any of aspects 2 through 6, wherein transmitting the first HARQ feedback portion and the second HARQ feedback portion of the HARQ feedback message with the PUSCH message comprises: refraining to include the second quantity of REs in the HARQ feedback message based at least in part on the second quantity of bits being zero.

Aspect 8: The method of any of aspects 1 through 7, wherein transmitting the first HARQ feedback portion and the second HARQ feedback portion of the HARQ feedback message with the PUSCH message further comprises: transmitting the second HARQ feedback portion of the HARQ feedback message with the PUSCH message in accordance with the rate-matching procedure and the puncturing procedure, wherein the puncturing procedure is based at least in part on the second quantity of REs in accordance with the second HARQ feedback portion reporting scheme.

Aspect 9: The method of aspect 8, wherein the rate-matching procedure is based at least in part on the first quantity of REs.

Aspect 10: The method of any of aspects 8 through 9, further comprising: determining that CSI is available for transmission with the PUSCH message; determining a maximum amount of the second quantity of REs based on the maximum amount of the second quantity of bits, wherein the maximum amount of the second quantity of bits is independent of the content of the first HARQ feedback portion; reserving the maximum amount of the second quantity of REs for the puncturing procedure; and allocating, for transmission with the PUSCH message, a third quantity of REs corresponding to the CSI, wherein the third quantity of REs are exclusive of the reserved maximum amount of the second quantity of REs.

Aspect 11: The method of aspect 10, wherein transmitting the first HARQ feedback portion and the second HARQ feedback portion of the HARQ feedback message with the PUSCH message comprises: allocating a subset of the maximum amount of the second quantity of REs for the second HARQ feedback portion based at least in part on the second quantity of bits, wherein the subset is the second quantity of REs and is less than or equal to the maximum amount of the second quantity of REs; and transmitting the third quantity of REs with the PUSCH message in accordance with the rate-matching procedure, wherein the puncturing procedure is based at least in part on the subset of the maximum amount of the second quantity of REs.

Aspect 12: The method of any of aspects 1 through 11, wherein transmitting the first HARQ feedback portion and the second HARQ feedback portion of the HARQ feedback message with the PUSCH message further comprises: transmitting the second HARQ feedback portion of the HARQ feedback message with the PUSCH message in accordance with a rate-matching procedure based at least in part on a last of the one or more PDSCH messages preceding the transmission of the PUSCH message by a threshold time that is associated with the two-part HARQ feedback reporting scheme, wherein the rate-matching procedure is based at least in part on the first quantity of REs and the second quantity of REs in accordance with the second HARQ feedback portion reporting scheme.

Aspect 13: The method of aspect 12, wherein the threshold time is based at least in part on a quantity of symbols associated with a capability of the UE.

Aspect 14: The method of any of aspects 12 through 13, wherein application of the second HARQ feedback portion reporting scheme is based at least in part on the PUSCH message including an uplink transport block.

Aspect 15: The method of any of aspects 12 through 14, wherein the one or more PDSCH messages are a first set of PDSCH messages, the method further comprising: receiving a second set of PDSCH messages for which additional HARQ feedback is scheduled to overlap with the transmission of the PUSCH message, wherein the second set of PDSCH messages are received before the transmission of the PUSCH message by less than the threshold time that is associated with the two-part HARQ feedback reporting scheme; and transmitting the additional HARQ feedback with the first quantity of REs in accordance with a single-part HARQ feedback reporting scheme.

Aspect 16: The method of aspect 15, wherein the HARQ feedback associated with the first set of PDSCH messages is associated with a first downlink assignment indicator (DAI) counting process and a first HARQ sub-codebook, and the additional HARQ feedback associated with the second set of PDSCH messages is associated with a second DAI counting process and a second HARQ sub-codebook.

Aspect 17: The method of any of aspects 15 through 16, wherein application of the second HARQ feedback portion reporting scheme is based at least in part on the PUSCH message including an uplink transport block.

Aspect 18: A method for wireless communications at a network entity, comprising: transmitting one or more PDSCH messages for which HARQ feedback is scheduled to be reported, wherein reporting of the HARQ feedback is scheduled to overlap with transmission of an PUSCH message, and wherein the HARQ feedback is configured to be reported, at least in part, in accordance with a two-part HARQ feedback reporting scheme for reporting a HARQ feedback message that includes a first HARQ feedback portion corresponding to a first quantity of bits that is fixed and a second HARQ feedback portion corresponding to a second quantity of bits that is variable based at least in part on a content of the first HARQ feedback portion; receiving the first HARQ feedback portion of the HARQ feedback message with the PUSCH message on the first quantity of REs and the second HARQ feedback portion of the HARQ feedback message with the PUSCH message on the second quantity of REs, the second HARQ feedback portion transmitted in accordance with at least a rate-matching procedure or a puncturing procedure, wherein a first quantity of REs is based at least in part on the first quantity of bits, and wherein a second quantity of REs is based at least in part on the second quantity of bits or a maximum amount of the second quantity of bits in accordance with a second HARQ feedback portion reporting scheme; and decoding the HARQ feedback message in accordance with the second HARQ feedback portion reporting scheme.

Aspect 19: The method of aspect 18, wherein a maximum amount of the second quantity of bits is independent of the content of the first HARQ feedback portion, the second HARQ feedback portion reporting scheme defines that the second quantity of REs is based at least in part on the maximum amount of the second quantity of bits.

Aspect 20: The method of aspect 19, wherein the second quantity of REs is based at least in part on a quantity of CRC bits corresponding to the maximum amount of the second quantity of bits.

Aspect 21: The method of any of aspects 19 through 20, wherein the second quantity of REs is populated with a sequence of values that is based at least in part on the second quantity of bits being zero.

Aspect 22: The method of any of aspects 18 through 21, wherein receiving the first HARQ feedback portion and the second HARQ feedback portion of the HARQ feedback message with the PUSCH message further comprises: receiving the second HARQ feedback portion of the HARQ feedback message with the PUSCH message in accordance with the rate-matching procedure and a puncturing procedure, wherein the puncturing procedure is based at least in part on the second quantity of REs in accordance with the second HARQ feedback portion reporting scheme.

Aspect 23: The method of aspect 22, wherein the rate-matching procedure is based at least in part on the first quantity of REs.

Aspect 24: The method of any of aspects 18 through 23, wherein receiving the first HARQ feedback portion and the second HARQ feedback portion of the HARQ feedback message with the PUSCH message further comprises:

receiving the second HARQ feedback portion of the HARQ feedback message with the PUSCH message in accordance with a rate-matching procedure based at least in part on a last of the one or more PDSCH messages preceding transmission, to the network entity, of the PUSCH message by a threshold time that is associated with the two-part HARQ feedback reporting scheme, wherein the rate-matching procedure is based at least in part on the first quantity of REs and the second quantity of REs in accordance with the second HARQ feedback portion reporting scheme.

Aspect 25: The method of aspect 24, wherein the threshold time is based at least in part on a quantity of symbols associated with a capability of a UE.

Aspect 26: The method of any of aspects 24 through 25, wherein the one or more PDSCH messages are a first set of PDSCH messages, the method further comprising: transmitting a second set of PDSCH messages for which additional HARQ feedback is scheduled to overlap with the transmission of the PUSCH message, wherein the second set of PDSCH messages are transmitted before the transmission of the PUSCH message by less than the threshold time that is associated with the two-part HARQ feedback reporting scheme; and receiving the additional HARQ feedback with the first quantity of REs in accordance with a single-part HARQ feedback reporting scheme.

Aspect 27: The method of aspect 26, wherein the HARQ feedback associated with the first set of PDSCH messages is associated with a first DAI counting process and a first HARQ sub-codebook, and the additional HARQ feedback associated with the second set of PDSCH messages is associated with a second DAI counting process and a second HARQ sub-codebook.

Aspect 28: A UE for wireless communications, comprising one or more memories storing processor-executable code, and one or more processors coupled with the one or more memories and individually or collectively operable to execute the code to cause the UE to perform a method of any of aspects 1 through 17.

Aspect 29: A UE for wireless communications, comprising at least one means for performing a method of any of aspects 1 through 17.

Aspect 30: A non-transitory computer-readable medium storing code for wireless communications, the code comprising instructions executable by one or more processors to perform a method of any of aspects 1 through 17.

Aspect 31: A network entity for wireless communications, comprising one or more memories storing processor-executable code, and one or more processors coupled with the one or more memories and individually or collectively operable to execute the code to cause the network entity to perform a method of any of aspects 18 through 27.

Aspect 32: A network entity for wireless communications, comprising at least one means for performing a method of any of aspects 18 through 27.

Aspect 33: A non-transitory computer-readable medium storing code for wireless communications, the code comprising instructions executable by one or more processors to perform a method of any of aspects 18 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

receive one or more physical downlink shared channel (PDSCH) messages for which HARQ feedback is scheduled to be reported, wherein reporting of the HARQ feedback is scheduled to overlap with transmission of a physical uplink shared channel (PUSCH) message, and wherein the HARQ feedback is configured to be reported, at least in part, in accordance with a two-part HARQ feedback reporting scheme for reporting a HARQ feedback message that includes a first HARQ feedback portion corresponding to a first quantity of bits that is fixed and a second HARQ feedback portion corresponding to a second quantity of bits that is variable based at least in part on a content of the first HARQ feedback portion;

determine a first quantity of resource elements based at least in part on the first quantity of bits;

determine, in accordance with a second HARQ feedback portion reporting scheme, a second quantity of resource elements based at least in part on the second quantity of bits or to a maximum amount of the second quantity of bits; and transmit the first HARQ feedback portion of the HARQ feedback message with the PUSCH message on the first quantity of resource elements and the second HARQ feedback portion of the HARQ feedback message with the PUSCH message on the second quantity of resource elements, the second HARQ feedback portion transmitted in accordance with at least a rate-matching procedure or a puncturing procedure.

2. The UE of claim 1, wherein, to determine the second quantity of resource elements, the one or more processors are individually or collectively further operable to execute the code to cause the UE to:

determine the maximum amount of the second quantity of bits independent of the content of the first HARQ feedback portion, wherein the second HARQ feedback portion reporting scheme defines that the second quantity of resource elements is based at least in part on the maximum amount of the second quantity of bits.

3. The UE of claim 2, wherein the second quantity of resource elements is based at least in part on a quantity of cyclic redundancy check bits corresponding to the maximum amount of the second quantity of bits.

4. The UE of claim 2, wherein application of the second HARQ feedback portion reporting scheme is based at least in part on the PUSCH message including an uplink transport block.

5. The UE of claim 2, wherein application of the second HARQ feedback portion reporting scheme is based at least in part on a last of the one or more PDSCH messages being received less than a threshold duration of time prior to transmission of the PUSCH message.

6. The UE of claim 2, wherein the second quantity of resource elements is populated with a sequence of values that is based at least in part on the second quantity of bits being zero.

7. The UE of claim 2, wherein, to transmit the first HARQ feedback portion and the second HARQ feedback portion of the HARQ feedback message with the PUSCH message, the one or more processors are individually or collectively operable to execute the code to cause the UE to:

refrain to include the second quantity of resource elements in the HARQ feedback message based at least in part on the second quantity of bits being zero.

8. The UE of claim 1, wherein, to transmit the first HARQ feedback portion and the second HARQ feedback portion of the HARQ feedback message with the PUSCH message, the one or more processors are individually or collectively further operable to execute the code to cause the UE to:

transmit the second HARQ feedback portion of the HARQ feedback message with the PUSCH message in accordance with the rate-matching procedure and the puncturing procedure, wherein the puncturing procedure is based at least in part on the second quantity of resource elements in accordance with the second HARQ feedback portion reporting scheme.

9. The UE of claim 8, wherein the rate-matching procedure is based at least in part on the first quantity of resource elements.

10. The UE of claim 8, wherein the one or more processors are individually or collectively further operable to execute the code to cause the UE to:

determine that channel state information (CSI) is available for transmission with the PUSCH message;

determine a maximum amount of the second quantity of resource elements based on the maximum amount of the second quantity of bits, wherein the maximum amount of the second quantity of bits is independent of the content of the first HARQ feedback portion;

reserve the maximum amount of the second quantity of resource elements for the puncturing procedure; and allocate, for transmission with the PUSCH message, a third quantity of resource elements corresponding to the CSI, wherein the third quantity of resource elements are exclusive of the reserved maximum amount of the second quantity of resource elements.

11. The UE of claim 10, wherein, to transmit the first HARQ feedback portion and the second HARQ feedback portion of the HARQ feedback message with the PUSCH message, the one or more processors are individually or collectively operable to execute the code to cause the UE to:

allocate a subset of the maximum amount of the second quantity of resource elements for the second HARQ feedback portion based at least in part on the second quantity of bits, wherein the subset is the second quantity of resource elements and is less than or equal to the maximum amount of the second quantity of resource elements; and transmit the third quantity of resource elements with the PUSCH message in accordance with the rate-matching procedure, wherein the puncturing procedure is based at least in part on the subset of the maximum amount of the second quantity of resource elements.

12. The UE of claim 1, wherein, to transmit the first HARQ feedback portion and the second HARQ feedback portion of the HARQ feedback message with the PUSCH message, the one or more processors are individually or collectively further operable to execute the code to cause the UE to:

transmit the second HARQ feedback portion of the HARQ feedback message with the PUSCH message in accordance with a rate-matching procedure based at least in part on a last of the one or more PDSCH messages preceding the transmission of the PUSCH message by a threshold time that is associated with the two-part HARQ feedback reporting scheme, wherein the rate-matching procedure is based at least in part on the first quantity of resource elements and the second quantity of resource elements in accordance with the second HARQ feedback portion reporting scheme.

13. The UE of claim 12, wherein the threshold time is based at least in part on a quantity of symbols associated with a capability of the UE.

14. The UE of claim 12, wherein application of the second HARQ feedback portion reporting scheme is based at least in part on the PUSCH message including an uplink transport block.

15. The UE of claim 12, wherein the one or more PDSCH messages are a first set of PDSCH messages, and the one or more processors are individually or collectively further operable to execute the code to cause the UE to:

receive a second set of PDSCH messages for which additional HARQ feedback is scheduled to overlap with the transmission of the PUSCH message, wherein the second set of PDSCH messages are received before the transmission of the PUSCH message by less than the threshold time that is associated with the two-part HARQ feedback reporting scheme; and transmit the additional HARQ feedback with the first quantity of resource elements in accordance with a single-part HARQ feedback reporting scheme.

16. The UE of claim 15, wherein the HARQ feedback associated with the first set of PDSCH messages is associated with a first downlink assignment indicator (DAI) counting process and a first HARQ sub-codebook, and the additional HARQ feedback associated with the second set of PDSCH messages is associated with a second DAI counting process and a second HARQ sub-codebook.

17. The UE of claim 15, wherein application of the second HARQ feedback portion reporting scheme is based at least in part on the PUSCH message including an uplink transport block.

18. A network entity, comprising:

one or more memories storing processor-executable code; and one or more processors coupled with the one or more memories and individually or collectively operable to execute the code to cause the network entity to:

transmit one or more physical downlink shared channel (PDSCH) messages for which HARQ feedback is scheduled to be reported, wherein reporting of the HARQ feedback is scheduled to overlap with transmission of a physical uplink shared channel (PUSCH) message, and wherein the HARQ feedback is configured to be reported, at least in part, in accordance with a two-part HARQ feedback reporting scheme for reporting a HARQ feedback message that includes a first HARQ feedback portion corresponding to a first quantity of bits that is fixed and a second HARQ feedback portion corresponding to a second quantity of bits that is variable based at least in part on a content of the first HARQ feedback portion;

receive the first HARQ feedback portion of the HARQ feedback message with the PUSCH message on the first quantity of resource elements and the second HARQ feedback portion of the HARQ feedback message with the PUSCH message on the second quantity of resource elements, the second HARQ feedback portion transmitted in accordance with at least a rate-matching procedure or a puncturing procedure, wherein a first quantity of resource elements is based at least in part on the first quantity of bits, and wherein a second quantity of resource elements is based at least in part on the second quantity of bits or a maximum amount of the second quantity of bits in accordance with a second HARQ feedback portion reporting scheme; and decode the HARQ feedback message in accordance with the second HARQ feedback portion reporting scheme.

19. The network entity of claim 18, wherein a maximum amount of the second quantity of bits is independent of the content of the first HARQ feedback portion, and wherein the second HARQ feedback portion reporting scheme defines that the second quantity of resource elements is based at least in part on the maximum amount of the second quantity of bits.

20. The network entity of claim 19, wherein the second quantity of resource elements is based at least in part on a quantity of cyclic redundancy check bits corresponding to the maximum amount of the second quantity of bits.

21. The network entity of claim 19, wherein the second quantity of resource elements is populated with a sequence of values that is based at least in part on the second quantity of bits being zero.

22. The network entity of claim 18, wherein, to receive the first HARQ feedback portion and the second HARQ feedback portion of the HARQ feedback message with the PUSCH message, the one or more processors are individually or collectively further operable to execute the code to cause the network entity to:

receive the second HARQ feedback portion of the HARQ feedback message with the PUSCH message in accordance with the rate-matching procedure and a puncturing procedure, wherein the puncturing procedure is based at least in part on the second quantity of resource elements in accordance with the second HARQ feedback portion reporting scheme.

23. The network entity of claim 22, wherein the rate-matching procedure is based at least in part on the first quantity of resource elements.

24. The network entity of claim 18, wherein, to receive the first HARQ feedback portion and the second HARQ feedback portion of the HARQ feedback message with the PUSCH message, the one or more processors are individually or collectively further operable to execute the code to cause the network entity to:

receive the second HARQ feedback portion of the HARQ feedback message with the PUSCH message in accordance with a rate-matching procedure based at least in part on a last of the one or more PDSCH messages preceding transmission, to the network entity, of the PUSCH message by a threshold time that is associated with the two-part HARQ feedback reporting scheme, wherein the rate-matching procedure is based at least in part on the first quantity of resource elements and the second quantity of resource elements in accordance with the second HARQ feedback portion reporting scheme.

25. The network entity of claim 24, wherein the threshold time is based at least in part on a quantity of symbols associated with a capability of a user equipment (UE).

26. The network entity of claim 24, wherein the one or more PDSCH messages are a first set of PDSCH messages, and the one or more processors are individually or collectively further operable to execute the code to cause the network entity to:

transmit a second set of PDSCH messages for which additional HARQ feedback is scheduled to overlap with the transmission of the PUSCH message, wherein the second set of PDSCH messages are transmitted before the transmission of the PUSCH message by less than the threshold time that is associated with the two-part HARQ feedback reporting scheme; and receive the additional HARQ feedback with the first quantity of resource elements in accordance with a single-part HARQ feedback reporting scheme.

27. The network entity of claim 26, wherein the HARQ feedback associated with the first set of PDSCH messages is associated with a first downlink assignment indicator (DAI) counting process and a first HARQ sub-codebook, and the additional HARQ feedback associated with the second set of PDSCH messages is associated with a second DAI counting process and a second HARQ sub-codebook.

28. A method for wireless communications at a user equipment (UE), comprising:

receiving one or more physical downlink shared channel (PDSCH) messages for which HARQ feedback is scheduled to be reported, wherein reporting of the HARQ feedback is scheduled to overlap with transmission of a physical uplink shared channel (PUSCH) message, and wherein the HARQ feedback is configured to be reported, at least in part, in accordance with a two-part HARQ feedback reporting scheme for reporting a HARQ feedback message that includes a first HARQ feedback portion corresponding to a first quantity of bits that is fixed and a second HARQ feedback portion corresponding to a second quantity of bits that is variable based at least in part on a content of the first HARQ feedback portion;

determining a first quantity of resource elements based at least in part on the first quantity of bits;

determining, in accordance with a second HARQ feedback portion reporting scheme, a second quantity of resource elements based at least in part on the second quantity of bits or to a maximum amount of the second quantity of bits; and transmitting the first HARQ feedback portion of the HARQ feedback message with the PUSCH message on the first quantity of resource elements and the second HARQ feedback portion of the HARQ feedback message with the PUSCH message on the second quantity of resource elements, the second HARQ feedback portion transmitted in accordance with at least a rate-matching procedure or a puncturing procedure.

29. The method of claim 28, wherein determining the second quantity of resource elements further comprises:

determining the maximum amount of the second quantity of bits independent of the content of the first HARQ feedback portion, wherein the second HARQ feedback portion reporting scheme defines that the second quantity of resource elements is based at least in part on the maximum amount of the second quantity of bits.

30. A method for wireless communications at a network entity, comprising:

transmitting one or more physical downlink shared channel (PDSCH) messages for which HARQ feedback is scheduled to be reported, wherein reporting of the HARQ feedback is scheduled to overlap with transmission of a physical uplink shared channel (PUSCH) message, and wherein the HARQ feedback is configured to be reported, at least in part, in accordance with a two-part HARQ feedback reporting scheme for reporting a HARQ feedback message that includes a first HARQ feedback portion corresponding to a first quantity of bits that is fixed and a second HARQ feedback portion corresponding to a second quantity of bits that is variable based at least in part on a content of the first HARQ feedback portion;

receiving the first HARQ feedback portion of the HARQ feedback message with the PUSCH message on the first quantity of resource elements and the second HARQ feedback portion of the HARQ feedback message with the PUSCH message on the second quantity of resource elements, the second HARQ feedback portion transmitted in accordance with at least a rate-matching procedure or a puncturing procedure, wherein a first quantity of resource elements is based at least in part on the first quantity of bits, and wherein a second quantity of resource elements is based at least in part on the second quantity of bits or a maximum amount of the second quantity of bits in accordance with a second HARQ feedback portion reporting scheme; and decoding the HARQ feedback message in accordance with the second HARQ feedback portion reporting scheme.

* * * * *